United States Patent
Su

(10) Patent No.: US 12,069,676 B2
(45) Date of Patent: Aug. 20, 2024

(54) SENDING REFERENCE SIGNALS IN A WIRELESS COMMUNICATION SYSTEM

(71) Applicant: HUAWEI TECHNOLOGIES CO., LTD., Guangdong (CN)

(72) Inventor: Liyan Su, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 449 days.

(21) Appl. No.: 17/387,330

(22) Filed: Jul. 28, 2021

(65) Prior Publication Data

US 2021/0360598 A1 Nov. 18, 2021

Related U.S. Application Data

(63) Continuation of application No. PCT/CN2019/073376, filed on Jan. 28, 2019.

(51) Int. Cl.
*H04W 72/23* (2023.01)
*H04L 5/14* (2006.01)

(52) U.S. Cl.
CPC .............. *H04W 72/23* (2023.01); *H04L 5/14* (2013.01)

(58) Field of Classification Search
None
See application file for complete search history.

(56) References Cited

U.S. PATENT DOCUMENTS

| | | | |
|---|---|---|---|
| 2011/0319068 A1 | 12/2011 | Kim et al. | |
| 2016/0249359 A1* | 8/2016 | Yamazaki | H04W 72/0453 |
| 2019/0230546 A1* | 7/2019 | Takahashi | H04L 5/0051 |

FOREIGN PATENT DOCUMENTS

| | | |
|---|---|---|
| CN | 106953672 A | 7/2017 |
| CN | 107294585 A | 10/2017 |
| WO | 2018056789 A1 | 3/2018 |
| WO | 2018169375 A1 | 9/2018 |

OTHER PUBLICATIONS

PCT International Search Report and Written Opinion in International Application No. PCT/CN2019/073376, dated Oct. 8, 2019, 38 pages.

Extended European Search Report issued in European Application No. 19912829.9 on Nov. 26, 2021, 7 pages.

* cited by examiner

*Primary Examiner* — Anh Ngoc M Nguyen
(74) *Attorney, Agent, or Firm* — Fish & Richardson P.C.

(57) ABSTRACT

Example communication methods and example apparatus are provided. One example method includes determining, by a terminal device, a first parameter for sending a first reference signal based on downlink channel information, where the first reference signal carries the downlink channel information, and sending the first reference signal to a network device based on the first parameter.

20 Claims, 16 Drawing Sheets

SENDING REFERENCE SIGNALS IN A WIRELESS COMMUNICATION SYSTEM

CROSS-REFERENCE TO RELATED APPLICATIONS

This application is a continuation of International Application No. PCT/CN2019/073376, filed on Jan. 28, 2019, the disclosure of which is hereby incorporated by reference in its entirety.

TECHNICAL FIELD

This application relates to the field of communications technologies, and in particular, to a communication method and an apparatus.

BACKGROUND

A communication system may include a time division duplex (time division duplex, TDD) system and a frequency division duplex (frequency division duplex, FDD) system. In the TDD system, there is reciprocity between an instantaneous uplink channel and an instantaneous downlink channel; a terminal device sends a sounding reference signal (sounding reference signal, SRS) in uplink; a network device may estimate uplink channel state information by using the SRS; and downlink channel state information may be obtained based on the uplink channel state information. In the FDD system, there is no reciprocity between an instantaneous uplink channel and an instantaneous downlink channel, and a network device cannot obtain downlink channel state information by using uplink channel state information. However, whether a communication system is a TDD system or an FDD system depends on a frequency band used by the communication system, and the frequency band used by the communication system is fixed. As a result, a problem in obtaining downlink channel state information or another type of downlink channel information (for example, a part of downlink channel state information or a maximum eigenvector of a channel) cannot be resolved by switching the FDD system to the TDD system.

Currently, to resolve the problem in obtaining downlink channel information by a network device in an FDD system, a solution in which a terminal device uses a reference signal to carry downlink channel information is proposed. In this way, the terminal device may send the downlink channel information to the network device by sending the reference signal to the network device, so that the network device may obtain the downlink channel information by using the reference signal from the terminal device. Details of implementing this solution are still under discussion, and how the terminal device sends the reference signal is still an unresolved problem.

SUMMARY

This application provides a communication method and an apparatus, used for sending a reference signal that carries downlink channel information.

According to a first aspect, a communication method is provided. In the method, a terminal device determines a first parameter used for sending a first reference signal, and sends the first reference signal to a network device based on the first parameter. The network device receives the first reference signal from the terminal device, and determines downlink channel information based on the received first reference signal.

The first reference signal is used to carry the downlink channel information.

It should be noted that in this embodiment of this application, the first parameter may include only one parameter, or may include a group of parameters. This is not limited in this application.

According to the foregoing method, the terminal device determines the first parameter used for sending the first reference signal, and then sends the first reference signal based on the first parameter. The method for sending the first reference signal is provided.

In a possible design, the terminal device determines the first parameter based on the downlink channel information. According to this method, the terminal device can send the first reference signal without waiting for scheduling by the network device. A delay in sending the first reference signal by the terminal device is relatively short, so that the network device can obtain the downlink channel information relatively quickly, and further, the network device can schedule downlink transmission relatively quickly.

In a possible design, the network device sends first indication information to the terminal device, where the first indication information is used to indicate the first parameter. The terminal device receives the first indication information from the network device. The first parameter is used to indicate transmission of the first reference signal. According to this method, the network device may comprehensively consider a network condition, and indicate an appropriate first parameter to the terminal device.

In this embodiment of this application, the first indication information may indicate the first parameter in two manners. In one manner, the first indication information includes the first parameter. In the other manner, the first indication information includes an indication bit, and the first parameter is indicated by using a value of the indication bit. Optionally, the indication bit may be at least one bit.

In a possible design, the terminal device determines, based on the downlink channel information, a second parameter used for sending the first reference signal, and the terminal device sends the second parameter to the network device. For example, the terminal device may send second information to the network device, and indicate the second parameter through the second information. For example, the second information includes the second parameter, or the second information includes an indication bit, and the second parameter is indicated by using a value of the indication bit. Optionally, the indication bit may be at least one bit, and the value of the indication hit is a state of the at least one bit.

It should be noted that, in this application, an example in which there is only one terminal device is used for description. When there are a plurality of terminal devices, each of the plurality of terminal devices may perform the communication method provided in this application. For example, in this possible design, when there are a plurality of terminal devices, each of the plurality of terminal devices may determine, by using the method in the design, a second parameter used by the terminal device to send a first reference signal. It may be understood that, second parameters separately determined by the plurality of terminal devices may be the same or may be different. After each of the plurality of terminal devices determines the second parameter used by the terminal device to send the first reference signal, each of the plurality of terminal devices may send the second parameter determined by the terminal device to the network device.

In a possible design, before sending the first indication information to the terminal device, the network device further needs to determine the first parameter. For example, the network device determines the first parameter based on at least one second parameter, where the at least one second parameter is from at least one terminal device, and the second parameter is a parameter suggested for the transmission (transmission) of the first reference signal. Alternatively, the network device determines the first parameter based on uplink channel state information.

It should be noted that in this embodiment of this application, the first parameter and the second parameter may be a same parameter, or may be different parameters. In this embodiment of this application, the second parameter may include only one parameter, or may include a group of parameters. This is not limited in this application.

According to the foregoing method, the terminal device may suggest, to the network device by using signaling, the second parameter used for sending the first reference signal, and the network device may comprehensively determine, based on the second parameter suggested by the at least one terminal device, the first parameter for finally sending the first reference signal. In this way, through signaling interaction between the network device and the terminal device, the terminal device can send the first reference signal by using an optimal parameter or a nearly optimal parameter, thereby improving downlink channel feedback performance.

In a possible design, the first parameter belongs to a first parameter set. The first parameter set may be configured by the network device for the terminal device by using higher layer signaling or predefined.

In a possible design, the terminal device may determine, in the first parameter set, the first parameter based on the downlink channel information. In this design, the first parameter set includes at least one group of parameters used for sending the first reference signal.

In a possible design, the terminal device may alternatively send the first parameter to the network device, and the network device receives the first parameter from the terminal device. Alternatively, there is a correspondence between a format of the first reference signal and the first parameter, where the correspondence is predefined or configured by using higher layer signaling. In this way, the network device may obtain the first parameter, and may further correspondingly demodulate, based on the first parameter, the received first reference signal.

In a possible design, the first parameter includes but is not limited to at least one of a size of a first precoding resource group (precoding resource group, PRG) or a first bandwidth used for the first reference signal; and/or the second parameter includes but is not limited to at least one of a size of a second PRG or a second bandwidth used for the first reference signal.

According to a second aspect, an embodiment of this application provides a communication apparatus. The apparatus may be a terminal device, or may be an apparatus in a terminal device. The apparatus may include a processing module and a storage module, and these modules may perform the method performed by the terminal device according to any one of the first aspect or the possible implementations of the first aspect. Specifically:

The storage module stores a computer program.

The processing module is configured to invoke the computer program stored in the storage module, to enable the communication apparatus to perform the following operations:

determining a first parameter used for sending a first reference signal, where the first reference signal is used to carry downlink channel information; and sending the first reference signal to a network device based on the first parameter.

According to a third aspect, an embodiment of this application provides a terminal device, where the terminal device has a function of implementing actions of the terminal device in the method example of the first aspect. The function may be implemented by hardware, or may be implemented by hardware by executing corresponding software. The hardware or software includes one or more modules corresponding to the function. The module may be software and/or hardware.

In a possible design, the terminal device includes a memory, a transceiver, a processor; and a bus, where the memory, the transceiver, and the processor are connected through the bus. The processor invokes instructions stored in the memory, to perform the method according to the first aspect or the method according to any possible design of the first aspect.

According to a fourth aspect, an embodiment of this application provides a communication apparatus. The apparatus may be a network device, or may be an apparatus in a network device. The apparatus may include a processing module and a storage module, and these modules may perform the method performed by the network device according to any one of the first aspect or possible implementations of the first aspect. Specifically:

The storage module stores a computer program.

The processing module is configured to invoke the computer program stored in the storage module, to enable the communication apparatus to perform the following operations:

receiving a first reference signal from a terminal device, where the first reference signal is used to carry downlink channel information; and determining the downlink channel information based on the first reference signal.

According to a fifth aspect, an embodiment of this application provides a network device, where the network device has a function of implementing actions of the network device in the method example of the first aspect. The function may be implemented by hardware, or may be implemented by hardware by executing corresponding software. The hardware or software includes one or more modules corresponding to the function. The module may be software and/or hardware.

In a possible design, the network device includes a memory, a transceiver, a processor, and a bus, where the memory, the transceiver, and the processor are connected through the bus. The processor invokes instructions stored in the memory, to perform the method according to the first aspect or the method according to any possible design of the first aspect.

According to a sixth aspect, a chip is provided. The chip is connected to a memory or the chip includes a memory, and is configured to read and execute a software program stored in the memory, to implement the method according to any one of the first aspect or the possible designs of the first aspect.

According to a seventh aspect, a communication system is provided. The communication system includes the terminal device according to the second aspect and the network device according to the fourth aspect.

According to an eighth aspect, a communication system is provided. The communication system includes the terminal device according to the third aspect and the network device according to the fifth aspect.

According to a ninth aspect, an embodiment of this application further provides a computer storage medium. The computer storage medium stores computer-executable instructions, and when the computer-executable instructions are invoked by a computer, the computer is enabled to perform the method according to any one of the first aspect or the possible designs of the first aspect.

According to a tenth aspect, an embodiment of this application further provides a computer program product. The computer program product stores instructions, and when the instructions are run on a computer, the computer is enabled to perform the method according to any one of the first aspect or the possible designs of the first aspect.

DESCRIPTION OF EMBODIMENTS

Figure 1:
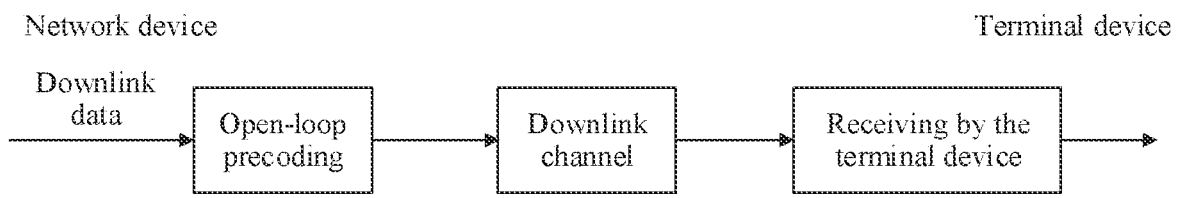
FIG. 1 is a schematic diagram of open-loop precoding according to an embodiment of this application.

To make the objectives, technical solutions, and advantages of this application clearer, the following further describes this application in detail with reference to the accompanying drawings.

In the following descriptions, some terms in embodiments of this application are described, to help a person skilled in the art have a better understanding.

(1) A terminal device includes a device that provides a user with voice and/or data connectivity, for example, may include a handheld device having a wireless connection function, or a processing device connected to a wireless modem. The terminal device may communicate with a core network through a radio access network (radio access network, RAN) and exchange voice and/or data with the RAN. The terminal device may include user equipment (user equipment, UE), a wireless terminal device, a mobile terminal device, a subscriber unit (subscriber unit), a subscriber station (subscriber station), a mobile station (mobile station), a mobile console (mobile), a remote station (remote station), an access point (access point, AP), a remote terminal device (remote terminal), an access terminal device (access terminal), a user terminal device (user terminal), a user agent (user agent), a user apparatus (user device), or the like. For example, the terminal device may include a mobile phone (which is also referred to as a "cellular" phone), a computer having a mobile terminal device, a portable, pocket-sized, handheld, computer built-in, or vehicle-mounted mobile apparatus, or a smart wearable device. For example, the terminal device is a personal communications service (personal communication service, PCS) phone, a cordless phone, a session initiation protocol (session initiation protocol. SIP) phone, a wireless local loop (wireless local loop. WU) station, or a personal digital assistant (personal digital assistant, PDA). The terminal device further includes a restricted device, for example, a device with relatively low power consumption, a device with a limited storage capacity, or a device with a limited computing capability. For example, the terminal device includes an information sensing device, for example, a barcode, radio frequency identification (radio frequency identification, RFID), a sensor, a global positioning system (global positioning system, GPS), or a laser scanner.

(2) A network device is a device in a wireless network. For example, the network device may be a radio access network (radio access network, RAN) node (or device) that enables a terminal device to access the wireless network, and may also be referred to as a base station. Currently, some examples of the network device are a next-generation NodeB (gNB), a transmission reception point (transmission reception point, TRP), an evolved NodeB (evolved NodeB, eNB), a NodeB (NodeB, NB), a home base station (for example, a home evolved NodeB, or a home NodeB, HNB), a baseband unit (base band unit, BBU), and a wireless fidelity (wireless fidelity, Wi-Fi) access point (access point, AP). In addition, in a network structure, the RAN may include a centralized unit (centralized unit, CU) node and a distributed unit (distributed unit, DU) node. In this structure, protocol layers of a base station are separated. Functions of some protocol layers are centrally controlled by the CU, and functions of some or all of the remaining protocol layers are distributed in the DU. The CU centrally controls the DU. A specific technology and a specific device form that are used for the base station are not limited in this embodiment of this application.

(3) A reference signal (reference signal, RS), which may also be referred to as a pilot signal, is a signal provided by a transmit end to a receive end for channel estimation or channel quality measurement. For example, the reference signal may be used for estimating channel state information. When the transmit end is a terminal device and the receive end is a network device, the reference signal may also be referred to as an uplink reference signal, and the uplink reference signal may be used for uplink channel estimation, uplink channel quality measurement, and the like. Correspondingly, when the transmit end is a network device and the receive end is a terminal device, the reference signal may also be referred to as a downlink reference signal, and the downlink reference signal may be used for downlink channel estimation, downlink channel quality measurement, and the like. Currently, the uplink reference signal may include, for example, a sounding reference signal (sounding reference signal, SRS) and a demodulation reference signal (demodulation reference signal, DM-RS). The downlink reference signal may include, for example, a channel state information reference signal (channel state information reference signal, CSI-RS) and a cell reference signal (cell reference signal, CRS).

(4) Channel information (channel information) generally refers to all matrices or vectors that may carry channel information, and may include a channel, a part of a channel, a channel eigenvector, and the like. Channel state information (channel state information), as it can be known by the name, refers to information that can reflect a channel state, and may be used to describe an attenuation factor of a signal on each transmission path, that is, a value of each element in a channel matrix. Currently, channel state information is usually estimated by using a reference signal. The channel state information may include, for example, information about a channel matrix, a multi path delay, and a Doppler frequency offset. For example, the uplink channel state information may include information about an uplink channel (matrix), a multipath delay, and a Doppler frequency offset.

Figure 2:
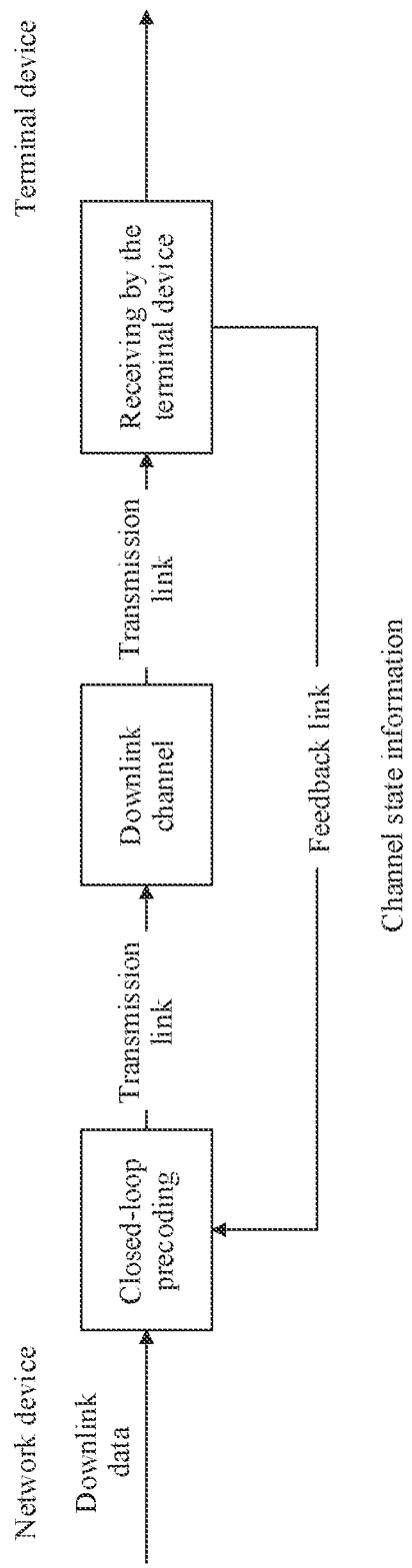
FIG. 2 is a schematic diagram of closed-loop precoding according to an embodiment of this application.

(5) Currently, in a wireless communication system, data may be transmitted in two manners: open-loop precoding and closed-loop precoding. When the open-loop precoding is used for data transmission, in the entire system, there is only one unidirectional transmission link for sending downlink data by the network device to the terminal device, and there is no feedback link for feeding back by the terminal device to the network device to assist the network device in better performing downlink transmission. Refer to FIG. 1. As shown in FIG. 1, when the open-loop precoding is used for data transmission, because the network device does not know state information about a channel from the network device to the terminal device, the network device can only send downlink data in all directions, resulting in an energy waste. When the closed-loop precoding is used for data transmission, in the entire system, there are a transmission link for sending downlink data by the network device to the terminal device and a feedback link from the terminal device to the network device. Refer to FIG. 2. As shown in FIG. 2, when the closed-loop precoding is used for data transmission, the terminal device may send a reference signal to the network device through a feedback link. The network device may estimate uplink channel state information based on the reference signal, so that the network device can send downlink data to a specific direction in which the terminal device is located (directional sending), thereby enhancing energy of receiving a signal by the terminal device. The embodiments of this application mainly relate to a communication system in which data is transmitted through the closed-loop precoding. Unless otherwise specified, a communication system in the following descriptions of this application is a system in which the closed-loop precoding is used.

(6) Currently, a wireless communication system can support two duplex modes: frequency division duplex (frequency division duplexing, FDD) and time division duplex (time division duplexing, TDD). For ease of description, in the following, a communication system supporting TDD is referred to as a TDD system, and correspondingly, a communication system supporting FDD is referred to as an FDD system. Whether a communication system is a TDD system or an FDD system depends on a frequency band used by the communication system. For a TDD system, uplink transmission and downlink transmission are performed at different time points on a same carrier, and there is reciprocity between an instantaneous uplink channel and an instantaneous downlink channel. The terminal device sends an uplink reference signal to the network device. The network device may estimate uplink channel state information by using the uplink reference signal, and obtain downlink channel information by using the uplink channel state information based on the reciprocity between the instantaneous uplink channel and the instantaneous downlink channel. For an FDD system, instantaneous uplink transmission and instantaneous downlink transmission are performed on different carriers. Because channels on different carriers are different, it may be understood that, in the FDD system, there is no reciprocity between an instantaneous uplink channel and an instantaneous downlink channel. Consequently, for the FDD system, a transmit end cannot obtain channel state information unless a receive end feeds back the channel state information. The embodiments of this application mainly relate to the FDD system.

(7) The terms "system" and "network" in the embodiments of this application may be used interchangeably. The term "a plurality of" means two or more. In view of this, "a plurality of" may also be understood as "at least two" in the embodiments of this application. The term "and/or" describes an association relationship between associated objects and represents that three relationships may exist. For example, A and/or B may represent the following three cases: Only A exists, both A and B exist, and only B exists. In addition, unless otherwise specified, the character "I" generally indicates an "or" relationship between associated objects.

It should be noted that, in descriptions of this application, words such as "first" and "second" are merely used for distinction and description, and shall not be understood as an indication or implication of relative importance or an indication or implication of a sequence.

Figure 3:
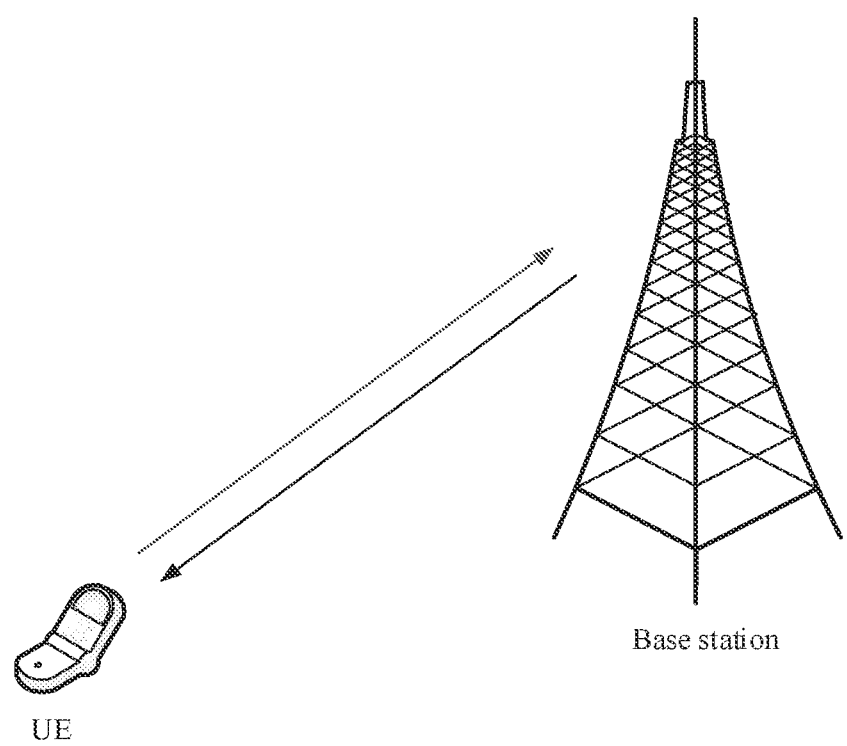
FIG. 3 is a schematic structural diagram of a communication system according to an embodiment of this application.

The following describes an application scenario according to an embodiment of this application. Refer to FIG. 3. A communication system in FIG. 3 includes one network device and one terminal device. The communication system is an FDD system in which closed-loop precoding is used. An example in which the network device is a base station and the terminal device is LIE is used. The base station provides a service for the UE. In FIG. 3, downlink transmission is used as an example. The base station may send downlink data to the UE through a downlink, or may receive, through a feedback link, an uplink reference signal sent by the UE. The base station may estimate uplink channel state information based on the uplink reference signal. However, because there is no reciprocity between an instantaneous uplink channel and an instantaneous downlink channel in the FDD system, the base station cannot obtain downlink channel information by using the uplink channel state information. However, whether a communication system is a TDD system or an FDD system depends on a frequency band used by the communication system, and the frequency band used by the communication system, which is either an FDD frequency band or a TDD frequency band, is usually fixed. As a result, a problem in obtaining downlink channel information cannot be resolved by switching the FDD system to the TDD system.

Currently, to resolve the problem in obtaining downlink channel information by a base station in an FDD system, a solution in which a reference signal is used to carry downlink channel information is proposed. By using this solution, LIE may send the downlink channel information to the base station by sending the reference signal that carries the downlink channel information to the base station, so that the base station may obtain the downlink channel information by using the reference signal from the UE. A name of the reference signal is not limited in this application. The reference signal may be referred to as a virtual precoding sounding reference signal (virtual precoding sounding reference signal, VIP-SRS) in the following, and all VIP-SRSs in the following are reference signals that carry downlink channel information.

Figure 4:
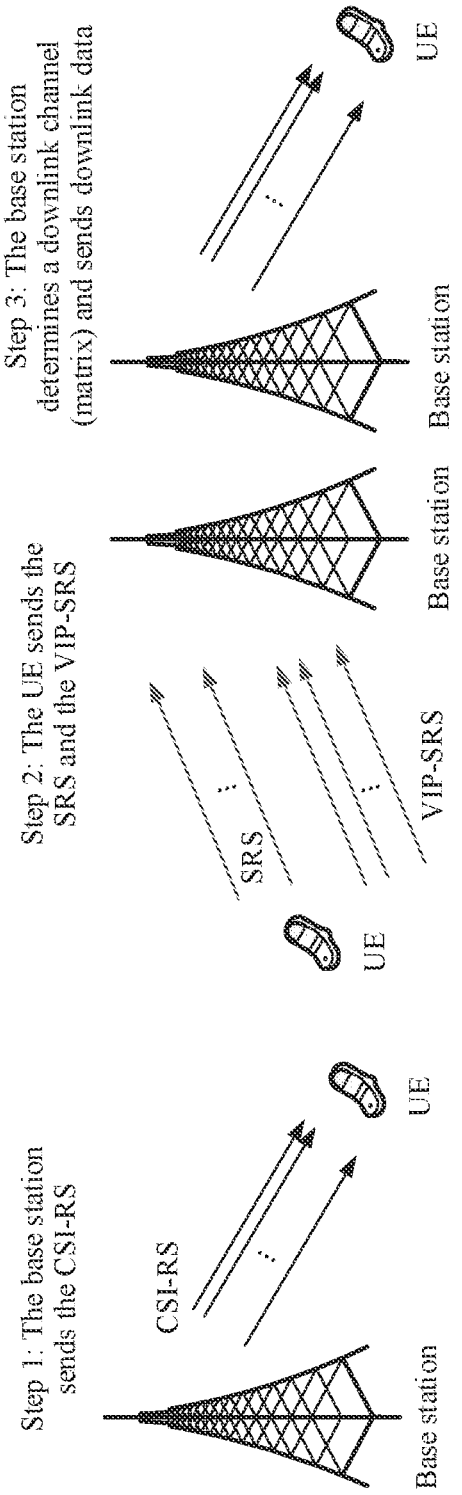
FIG. 4 is a schematic flowchart of communication according to an embodiment of this application.

The following uses an example in which uplink channel state information is an uplink channel (matrix), downlink channel information is a downlink channel (matrix), a downlink reference signal is a CSI-RS, and uplink reference signals are ail SRS and a VIP-SRS to describe specific content of the solution. Refer to FIG. 4. FIG. 4 corresponds to three steps, which are specifically as follows:

Step 1: A base station sends a CSI-RS to UE, and the UE estimates a downlink channel (matrix) based on the CSI-RS.

Step 2: The UE sends an SRS and a VIP-SRS to the base station, where the VIP-SRS carries the downlink channel (matrix). The base station may estimate an uplink channel (matrix) based on the SRS, and may estimate, based on the VIP-SRS, a product of the uplink channel (matrix) and the downlink channel (matrix), so that the base station can inversely calculate the downlink channel (matrix).

To further explain this step, some concepts need to be explained.

SRS: The UE sends an SRS over different transmit antenna ports by using different SRS resources. For example, UE with two ports sends an SRS over port 1 by using an SRS resource 1, and sends an SRS over port 2 by using an SRS resource 2. Because the SRS resources are different, the base station can distinguish the two SRSs, estimate state information about uplink channels from the port 1 of the UE to all ports of the base station based on the $1^{st}$ SRS, and estimate state information about uplink channels from the port 2 of the UE to all the ports of the base station based on the $2^{nd}$ SRS. The base station combines the two groups of information to obtain all uplink channel state information (information about channels from all ports of the UE to all ports of the base station). That is, an uplink channel (matrix) may be obtained.

SRS resource: An SRS resource includes a time domain resource, a frequency domain resource, and a used sequence that are occupied by an SRS. When two SRS resources are different, it means that at least one type of resources, such as time domain resources, frequency domain resources, or code domain resources, respectively corresponding to the two SRS resources are different. The base station can distinguish two SRSs, provided that different SRS resources are used by the two SRSs.

In the following, the uplink channel (matrix) is denoted as $$\begin{bmatrix} h_{11} & h_{12} & \cdots & h_{1M} \\ h_{21} & h_{22} & & h_{2M} \\ \vdots & & \ddots & \\ h_{L1} & h_{L2} & & h_{LM} \end{bmatrix},$$

where M is a quantity of transmit antenna ports of the UE, L is a quantity of receive antenna ports of the base station, and $h_{ij}$ represents a channel from a $j^{th}$ port of the UE to an $i^{th}$ port of the base station.

First, SRS sequences sent by the UE are separately described. The UE sends an SRS over the $1^{st}$ port by using the $1^{st}$ SRS resource, and the SRS is denoted as $$\begin{bmatrix} s_1 \\ 0 \\ \vdots \\ 0 \end{bmatrix}_{M \times 1},$$

indicating that $s_1$ is sent over only the port 1. Similarly, the UE further sends $s_2$, which is denoted as $$\begin{bmatrix} 0 \\ s_2 \\ \vdots \\ 0 \end{bmatrix}_{M \times 1},$$

over the port 2. By analogy, $s_M$ is sent over a port M, which is denoted as $$\begin{bmatrix} 0 \\ 0 \\ \vdots \\ s_M \end{bmatrix}_{M \times 1}.$$

A sum of these SRSs sent by the UE is a real SRS $$S = \begin{bmatrix} s_1 \\ s_2 \\ \vdots \\ s_M \end{bmatrix}_{M \times 1}$$

sent by the UE. The SRS sent by the UE arrives at the base station after passing through the uplink channel. It is assumed that a signal received by the base station is $$Y = \begin{bmatrix} h_{11} & h_{12} & \cdots & h_{1M} \\ h_{21} & h_{22} & & h_{2M} \\ \vdots & & \ddots & \\ h_{L1} & h_{L2} & & h_{LM} \end{bmatrix}_{L \times M} \begin{bmatrix} s_1 \\ s_2 \\ \vdots \\ s_M \end{bmatrix}_{M \times 1} + N,$$

where N is a receiver noise. For ease understanding, impact of the noise N may be ignored. Because the base station has known S sent by the UE, and usually S is associated with $ss^H=1$, the base station may perform a matrix operation to obtain an estimated value $$\hat{H}_{UL} = YS^H = \begin{bmatrix} h_{11} & \cdots & h_{1M} \\ \vdots & \ddots & \vdots \\ h_{L1} & \cdots & h_{LM} \end{bmatrix} + NS^H$$

of the uplink channel (matrix). The processing manner of the base station herein is merely an example. The base station usually uses another processing manner to reduce the impact of the noise N. It should be noted herein that, in this application, $s^H$ refers to a conjugate transpose of S.

VIP-SRS: Different from the SRS, each VIP-SRS can be sent over a plurality of antenna ports, and VIP-SRSs sent over different antenna ports have a same weighting coefficient or different weighting coefficients, that is, with precoding. In this case, an SRS sent by the UE on an SRS resource $s_i$ changes from $$\begin{bmatrix} 0 \\ \vdots \\ s_i \\ \vdots \\ 0 \end{bmatrix}_{M \times 1}$$

of the SRS to $$\begin{bmatrix} \beta_1 s_i \\ \vdots \\ \beta_j s_i \\ \vdots \\ \beta_M s_i \end{bmatrix}_{M \times 1}, \text{ and } \begin{bmatrix} \beta_{1i} \\ \vdots \\ \beta_{ji} \\ \vdots \\ \beta_{Mi} \end{bmatrix}_{M \times 1} s_i$$

is obtained after a simple variation, where $$\begin{bmatrix} \beta_{1i} \\ \vdots \\ \beta_{ji} \\ \vdots \\ \beta_{Mi} \end{bmatrix}_{M \times 1}$$

is referred to as precoding of the VIP-SRS. Similarly, the UE may alternatively send a plurality of VIP-SRSs, which are denoted as $$\begin{bmatrix} \beta_{1i} \\ \vdots \\ \beta_{ji} \\ \vdots \\ \beta_{Mi} \end{bmatrix}_{M \times 1} s_1, \ldots, \text{ and } \begin{bmatrix} \beta_{1N} \\ \vdots \\ \beta_{jN} \\ \vdots \\ \beta_{MN} \end{bmatrix}_{M \times 1} s_N.$$

A sum of the VIP-SRSs sent by the UE is a real VIP-SRS sequence $$S = \begin{bmatrix} \beta_{11} & \beta_{12} & \cdots & \beta_{1N} \\ \beta_{21} & \beta_{22} & & \beta_{2N} \\ \vdots & & \ddots & \\ \beta_{M1} & \beta_{M2} & & \beta_{MN} \end{bmatrix}_{M \times N} \begin{bmatrix} s_1 \\ s_2 \\ \vdots \\ s_N \end{bmatrix}_{N \times 1}$$

sent by the UE. The VIP-SRS sent by the UE arrives at the base station through an uplink channel, and the base station receives the following signal:

$$Y_{VIP} = \begin{bmatrix} h_{11} & h_{12} & \cdots & h_{1M} \\ h_{21} & h_{22} & & h_{2M} \\ \vdots & & \ddots & \\ h_{L1} & h_{L2} & & h_{LM} \end{bmatrix}_{L \times M} \begin{bmatrix} \beta_{11} & \beta_{12} & \cdots & \beta_{1N} \\ \beta_{21} & \beta_{22} & & \beta_{2N} \\ \vdots & & \ddots & \\ \beta_{M1} & \beta_{M2} & & \beta_{MN} \end{bmatrix}_{M \times N} \begin{bmatrix} s_1 \\ s_2 \\ \vdots \\ s_N \end{bmatrix}_{N \times 1} + N.$$

In this application, the base station and the UE agree in advance that precoding matrix)

$$B = \begin{bmatrix} \beta_{11} & \beta_{12} & \cdots & \beta_{1N} \\ \beta_{21} & \beta_{22} & & \beta_{2N} \\ \vdots & & \ddots & \\ \beta_{M1} & \beta_{M2} & & \beta_{MN} \end{bmatrix}_{M \times N}$$

is a downlink channel (matrix) $\hat{H}_{DL}$ estimated by the UE, and the UE may include the downlink channel (matrix) in a VIP-SRS and feed back the downlink channel (matrix) to the base station. In this case, the base station may estimate, based on $$\begin{bmatrix} s_1 \\ s_2 \\ \vdots \\ s_N \end{bmatrix}$$

and the uplink channel (matrix) $\hat{H}_{UL}$ previously estimated by using the SRS, the downlink channel (matrix) $\hat{H}_{DL}$.

Step 3: The base station calculates, based on the downlink channel (matrix), precoding used for downlink data transmission, and transmits downlink data.

Currently, implementation details of the foregoing solution in which the UE feeds back downlink channel information by using a reference signal (VIP-SRS) are still under discussion, and how the UE sends the reference signal (VIP-SRS) is still an unresolved problem.

To resolve the foregoing problem, an embodiment of this application provides a communication method, used for sending a reference signal that carries downlink channel information.

Figure 5:
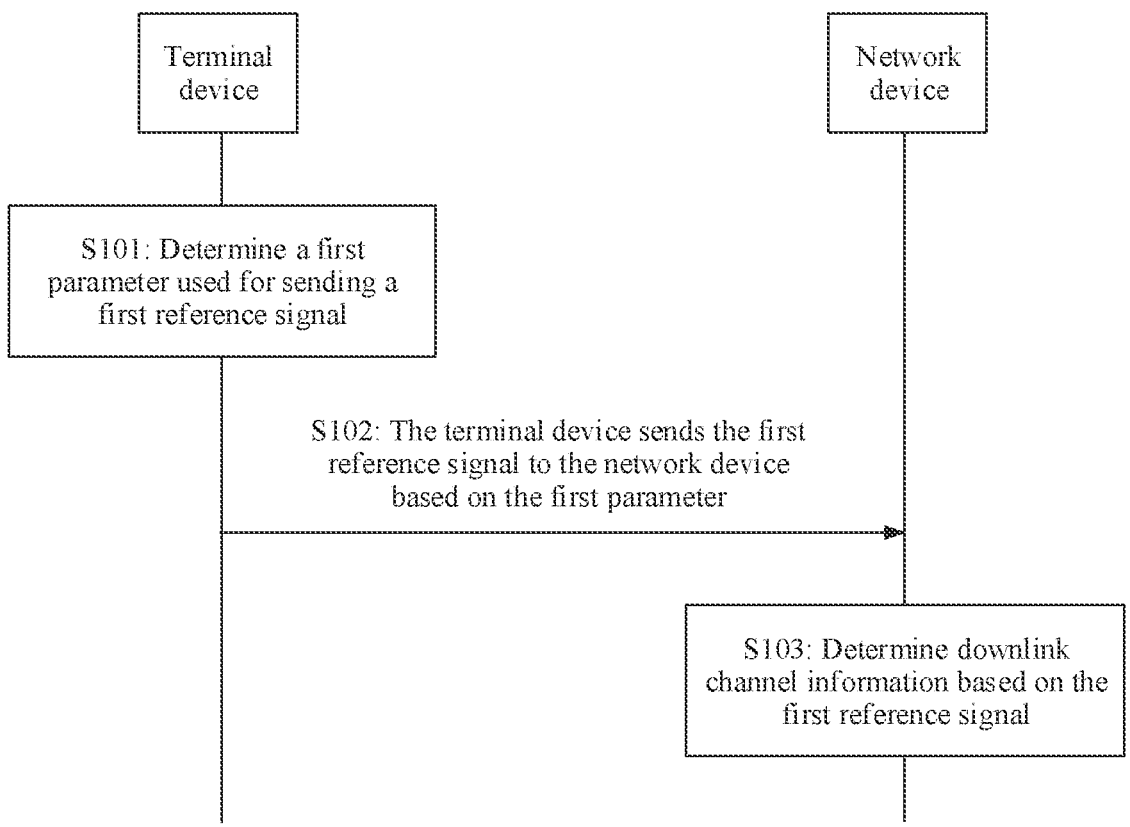
FIG. 5 is a flowchart of a communication method according to an embodiment of this application.

FIG. 5 is a flowchart of a communication method according to an embodiment of this application. As shown in FIG. 5, the method includes the following steps.

S101: A terminal device determines a first parameter used for sending a first reference signal. The first reference signal is used to carry downlink channel information. In this application, the first reference signal is an uplink reference signal, the first reference signal may be sent over a plurality of antenna ports, and first reference signals sent over different antenna ports have a same weighting coefficient or different weighting coefficients, that is, with precoding (a matrix) which may be understood as the VIP-SRS described above. The precoding (matrix) of the first reference signal is used as the downlink channel information, so that the first reference signal carries the downlink channel information. For details, refer to the foregoing descriptions of the VIP-SRS. It should be noted herein that "the first parameter used for sending the first reference signal" may be understood as that sending of the first reference signal is related to the first parameter, and may also refer to "the first parameter used for transmission of the first reference signal". It is not limited herein to that the first parameter is related to the sending of the first reference signal.

It should be noted that in this embodiment of this application, the first parameter may include only one parameter, or may include a group of parameters. This is not limited in this application. In addition, when the first parameter includes a group of parameters, a plurality of parameters in the group of parameters may be parameters of a same type, or may be parameters of different types. In this embodiment of this application, the first parameter may be all parameters used for sending/transmitting the first reference signal, or may be a part of parameters used for sending/transmitting the first reference signal.

In this embodiment of this application, the first parameter includes but is not limited to at least one of a size of a first precoding resource group (precoding resource group, PRG) or a first bandwidth used for the first reference signal. The first bandwidth used for the first reference signal may be understood as a bandwidth used for sending/transmitting the first reference signal.

In this embodiment of this application, the downlink channel information includes but is not limited to at least one of downlink channel frequency selectivity, a downlink channel matrix, a compressed downlink channel matrix, and an eigenvector corresponding to a largest eigenvalue in N eigenvalues of a downlink channel matrix, or eigenvectors corresponding to M largest eigenvalues in N eigenvalues of a downlink channel matrix, where M is an integer greater than or equal to 2, and N is an integer greater than or equal to M.

S102: The terminal device sends the first reference signal to a network device based on the first parameter, and the network device receives the first reference signal from the terminal device. It may also be understood that the terminal device sends the first reference signal to the network device on a resource corresponding to the first parameter.

S103: The network device determines the downlink channel information based on the first reference signal.

According to the foregoing method, the terminal device determines the first parameter, and sends the first reference signal based on the first parameter.

It should be noted that, in this embodiment of this application, an example in which there is only one terminal device is used for describing the communication method provided in this application. When there are a plurality of terminal devices, each of the plurality of terminal devices may perform the communication method provided in this application.

In this embodiment of this application, how the terminal device determines the first parameter used for sending the first reference signal is not limited. For example, the terminal device may determine the first parameter used for sending the first reference signal by using the following methods.

Figure 6:
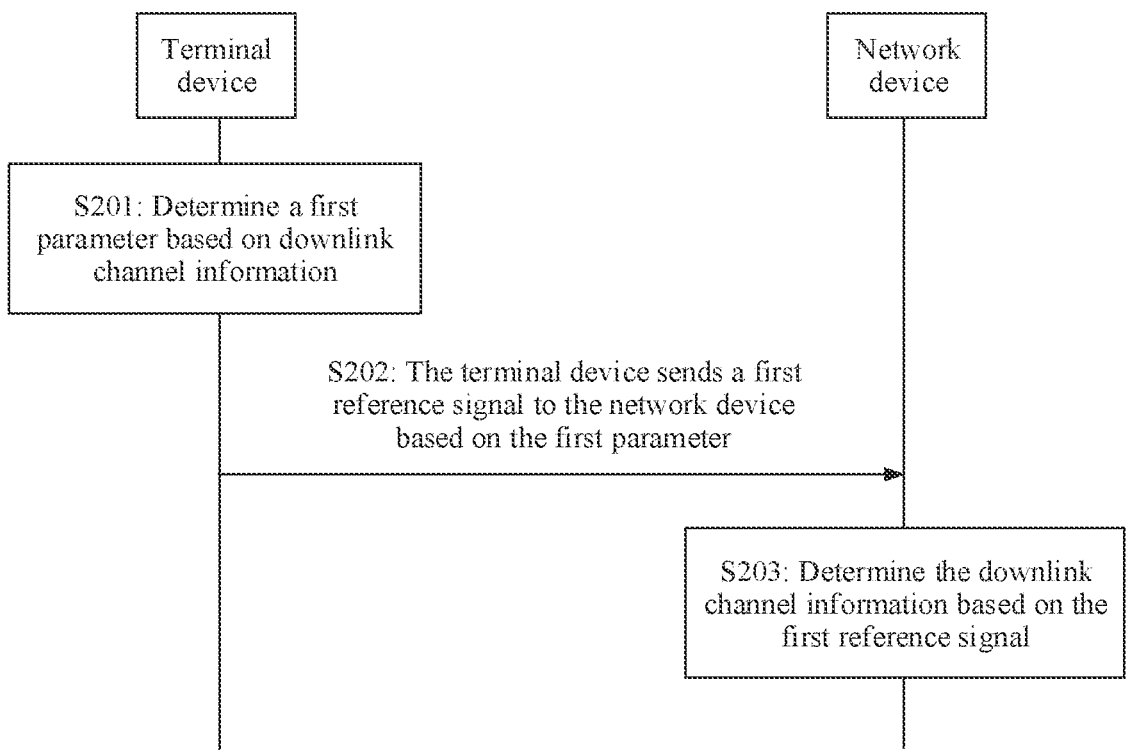
FIG. 6 is a flowchart of another communication method according to an embodiment of this application.

Method 1: The terminal device determines the first parameter based on the downlink channel information. FIG. 6 is a flowchart of another communication method according to an embodiment of this application.

As shown in FIG. 6, the method includes the following steps.

S201: A terminal device determines a first parameter based on downlink channel information.

In a possible example, before determining the first parameter based on the downlink channel information, the terminal device may estimate the downlink channel information based on a downlink reference signal sent by a network device. For example, the downlink reference signal is a CSI-RS. The terminal device may estimate the downlink channel information based on the CSI-RS.

An example in which the downlink channel information is based on downlink channel frequency selectivity and the first parameter is a size of a first PRG is used for describing how the terminal device determines the size of the first PRG based on the downlink channel frequency selectivity in the method 1. For example, when the downlink channel frequency selectivity is greater than a first threshold, the terminal device may determine that the size of the first PRG is less than a second threshold. When the downlink channel frequency selectivity is less than the first threshold, the terminal device may determine that the size of the first PRG is greater than a third threshold.

In this application, the second threshold and the third threshold may be the same or different, and the first threshold, the second threshold, and the third threshold may all be empirical values. This is not limited in this application.

In a possible example, the terminal device may determine, based on the downlink channel information and a first parameter set, the first parameter, or the terminal device may determine, in a first parameter set, the first parameter based on the downlink channel information. The determined first parameter belongs to the first parameter set, where the first parameter set is configured by using higher layer signaling or predefined. In this example, the first parameter set may include at least one group of parameters used for sending the first reference signal. For example, the terminal device may determine, in the first parameter set, the first parameter based on the downlink channel information. For example, the first parameter set configured by using higher layer signaling or predefined is denoted as {parameter 1, parameter 2, parameter 3}. The terminal device may estimate a downlink channel (matrix) obtained by the network device after the terminal device sends the first reference signal by using the parameter 1 as the first parameter, and further estimate a downlink precoding calculated by the network device based on the downlink channel (matrix). In this way, performance of downlink transmission (for example, downlink transmission spectral efficiency) from the network device to the terminal device after the terminal device sends the first reference signal by using the parameter 1 as the first parameter may be calculated. By analogy, the terminal device may calculate, one by one, corresponding downlink transmission performance when each parameter in the first parameter set is used as the first parameter for sending the first reference signal. In addition, the terminal device may further calculate, one by one, corresponding VIP-SRS resource overheads when each parameter in the first parameter set is used as the first parameter for sending the first reference signal, that is, a quantity of uplink resources occupied by the terminal device for sending a VIP-SRS. Finally, the terminal device determines the parameter 1 as the first parameter after considering the downlink transmission performance and the VIP-SRS resource overheads. Specifically, that the parameter 1 is determined as the first parameter may include but is not limited to the following several cases.

Case 1: Downlink transmission performance corresponding to the parameter 1 is better than downlink transmission performance corresponding to the parameter 2 and the parameter 3, and VIP-SRS resource overheads corresponding to the parameter 1, the parameter 2, and the parameter 3 are almost equal.

Case 2: Downlink transmission performance corresponding to the parameter 1 is almost the same as the downlink transmission performance corresponding to the parameter 2 and the parameter 3 (for example, a difference is less than 5%), but VIP-SRS resource overheads corresponding to the parameter 1 are far less than VIP-SRS resource overheads corresponding to the parameter 2 and the parameter 3.

S202: The terminal device sends the first reference signal to the network device based on the first parameter, and the network device receives the first reference signal sent by the terminal device.

S203: The network device determines the downlink channel information based on the first reference signal.

S202 and S203 are the same as S102 and S103 respectively. For repeated content, refer to each other. Details are not described herein again.

In the foregoing method 1, the terminal device determines the first parameter for sending the first reference signal, and the terminal device can directly send the first reference signal without waiting for scheduling by the network device, so that a sending delay can be reduced. In this way, the network device can quickly obtain the downlink channel information and can quickly schedule downlink transmission to the terminal device.

In this embodiment of this application, if the terminal device determines the first parameter in the method 1, after determining the first parameter, the terminal device may report the first parameter to the network device, or may not report the first parameter. This corresponds to the following three processing manners.

Processing manner 1: The terminal device sends the first parameter to the network device. For example, the terminal device may send first information to the network device, and indicate the first parameter through the first information. The first parameter is reported to the network device, so that complexity of processing by the network device can be reduced.

Processing manner 2: There is a correspondence between a format of the first reference signal sent by the terminal device and the first parameter, where the correspondence is predefined or configured by using higher layer signaling. For example, that the first parameter set configured by the network device for the terminal device is {parameter 1, parameter 2, parameter 3} is still used as an example. The network device may further configure the correspondence between the first parameter and the format of the first reference signal for the terminal device. As shown in Table 1, the network device may configure that the parameter 1 corresponds to sending the first reference signal on a frequency band 1, the parameter 2 corresponds to sending the first reference signal on a frequency band 2, and the parameter 3 corresponds to sending the first reference signal on a frequency band 3. In this case, if the network device detects the first reference signal on the frequency band 1, it is indicated that the terminal device sends the first reference signal by using the parameter 1 as the first parameter,

TABLE 1

| First parameter | Format of the first reference signal |
| --- | --- |
| Parameter 1 | Send the first reference signal on the frequency band 1 |
| Parameter 2 | Send the first reference signal on the frequency band 2 |
| Parameter 3 | Send the first reference signal on the frequency band 3 |

In the processing manner 2, the terminal device may send, without using signaling for indication, the first parameter to the network device through an implicit feedback, so that signaling overheads can be reduced. In addition, complexity of processing by the network device can be reduced by reporting the first parameter to the network device.

Processing manner 3: The terminal device does not send the first parameter to the network device. In this processing manner, after receiving the first reference signal sent by the terminal device, the network device demodulates the downlink channel information through blind detection. In this processing manner, the first parameter does not need to be reported, so that signaling overheads can be reduced, and a processing delay can be reduced.

It should be noted that, in this embodiment of this application, an example in which there is only one terminal device is used for describing the method 1. When there are a plurality of terminal devices, each of the plurality of terminal devices may perform the method 1.

The following describes another method for determining, by the terminal device, the first parameter used for sending the first reference signal.

Figure 7:
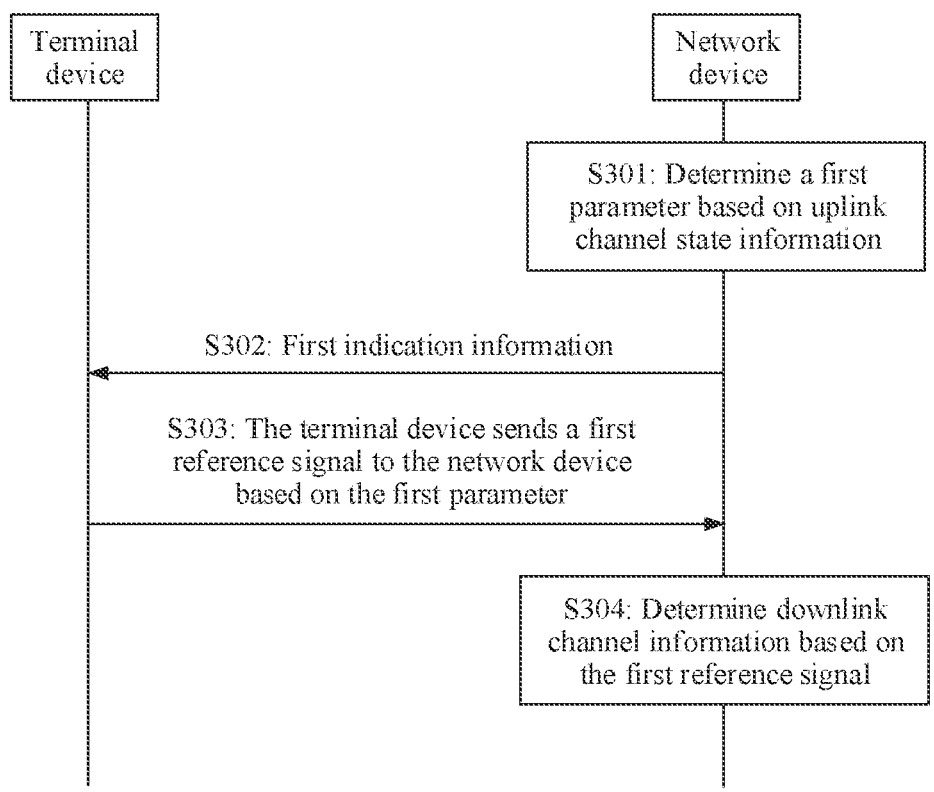
FIG. 7 is a flowchart of still another communication method according to an embodiment of this application.

Method 2: It is assumed that there is reciprocity between statistical features of an uplink channel and a downlink channel. In this case, the network device may determine the first parameter based on uplink channel state information, and may notify the terminal device by using signaling. FIG. 7 is a flowchart of still another communication method according to an embodiment of this application.

As shown in FIG. 7, the method includes the following steps.

S301: A network device determines a first parameter based on uplink channel state information.

The following uses an example in which the first parameter is a size of a first PRG to describe how the network device determines the first parameter based on the uplink channel state information. For example, it is assumed that the network device identifies, based on the uplink channel state information, that an uplink channel is in a flat fading state, that is, channels at different frequencies in an uplink bandwidth are substantially the same, and may further determine, based on reciprocity between statistical characteristics of the uplink channel and a downlink channel, that the downlink channel is also in a flat fading state. In this case, the network device considers that the terminal device only needs to feed back downlink channel information at a specific frequency to represent downlink channel information on an entire frequency band. Therefore, the network device may determine that the size of the first PRG is an entire downlink bandwidth.

In this embodiment of this application, the uplink channel state information includes but is not limited to an uplink channel (matrix), a compressed uplink channel (matrix), and the like.

In a possible example, before determining the first parameter based on the uplink channel state information, the network device may estimate the uplink channel state information based on an uplink reference signal sent by the terminal device. For example, the uplink reference signal is an SRS. The network device may estimate the uplink channel state information based on the SRS.

S302: The network device sends first indication information to the terminal device, and the terminal device receives the first indication information from the network device, where the first indication information is used to indicate the first parameter, and the first parameter is used to indicate transmission of a first reference signal.

In this embodiment of this application, the first indication information may indicate the first parameter in two manners. In one manner, the first indication information includes the first parameter. In the other manner, the first indication information includes an indication bit, and the first parameter is indicated by using a value of the indication bit. Optionally, the indication bit may be at least one bit.

In a possible example, when sending the first indication information to the terminal device, the network device may also send second indication information, where the second indication information is used to indicate the terminal device to send the first reference signal.

In this embodiment of this application, the first indication information and the second indication information may be sent by using existing signaling, or may be sent by using new signaling. This is not limited in this application. In a possible example, the network device sends the first indication information and the second indication information through downlink control information (downlink control information, DCI).

It should be noted that if the network device indicates the first parameter by using the indication bit, a correspondence between the value of the indication bit and the first parameter needs to be configured for the terminal device.

Table 2 shows a possible correspondence between the value of the indication bit and the first parameter.

TABLE 2

| DCI indication | Physical meaning |
| --- | --- |
| 01 | Use a parameter 1 |
| 10 | Use a parameter 2 |
| 11 | Use a parameter 3 |

In Table 2, an example in which the first indication information is sent through the DCI is used. It is assumed that the first parameter is indicated by using two bits of the DCI, and in Table 2, the first parameter includes the parameter 1, the parameter 2, and the parameter 3 that are determined by the network device, a value 01 of two bits of the DCI is used to indicate the terminal device to send the first reference signal by using the parameter 1, a value 10 of two bits of the DCI is used to indicate the terminal device to send the first reference signal by using the parameter 2, and a value 11 of two bits of the DCI is used to indicate the terminal device to send the first reference signal by using the parameter 3.

S303: The terminal device sends the first reference signal to the network device based on the first parameter, and the network device receives the first reference signal sent by the terminal device.

S304: The network device determines the downlink channel information based on the first reference signal.

S303 and S304 are the same as S102 and S103 respectively. For repeated content, refer to each other. Details are not described herein again.

According to the foregoing method 2, signaling interaction is performed between the network device and the terminal device, so that each terminal device can send the first reference signal by using an optimal parameter or a nearly optimal parameter, thereby improving downlink channel feedback performance.

It should be noted that, in this embodiment of this application, an example in which there is only one terminal device is used for describing the method 2. When there are a plurality of terminal devices, each of the plurality of terminal devices may perform the method 2.

The following describes still another method for determining, by the terminal device, the first parameter used for sending the first reference signal.

Figure 8:
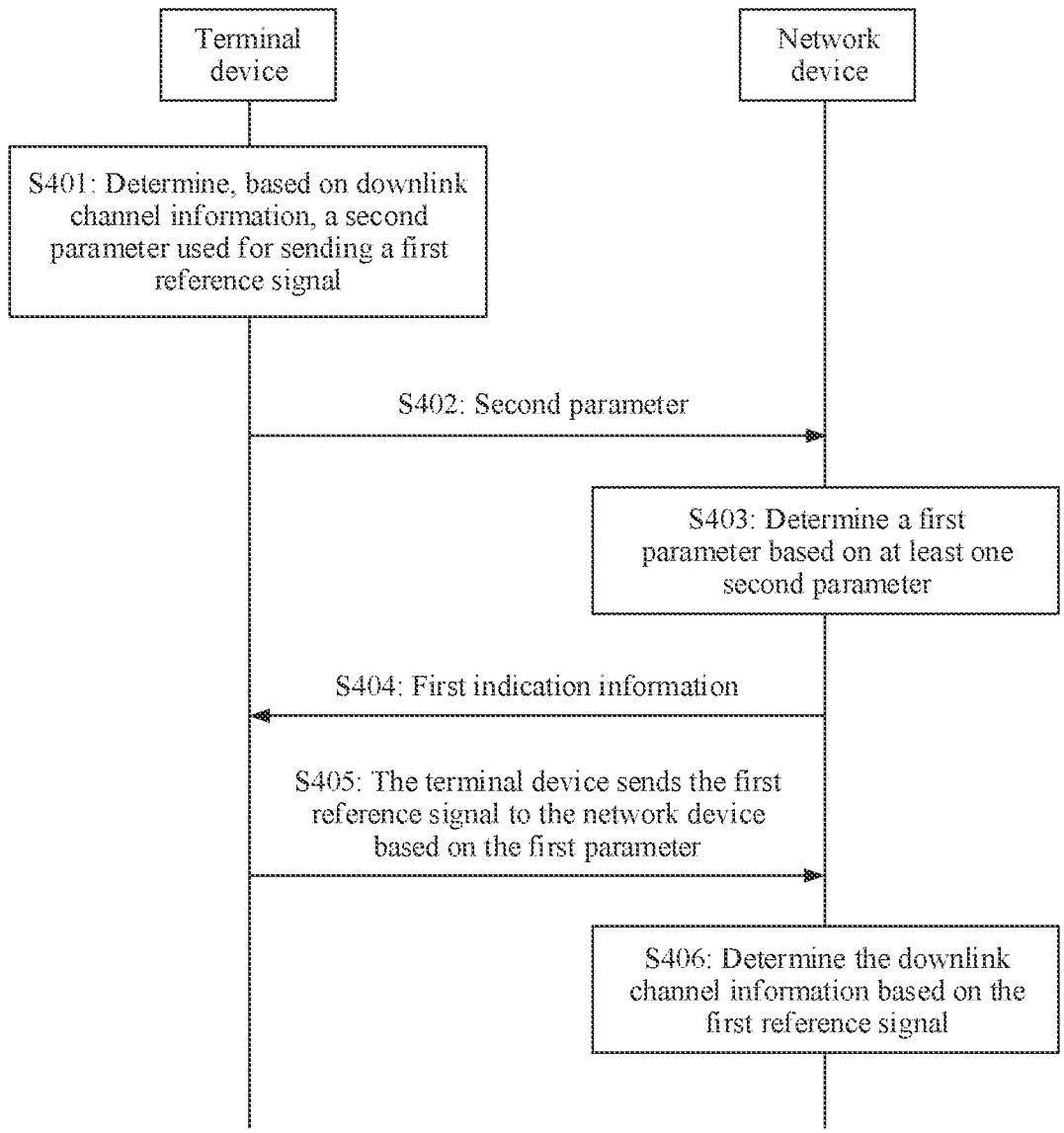
FIG. 8 is a flowchart of still another communication method according to an embodiment of this application.

Method 3: The terminal device suggests a to-be-used parameter to the network device. The network device determines, based on one or more to-be-used parameters suggested by the one or more terminal devices, the first parameter actually used for the transmission of the first reference signal, and notifies the terminal device of the determined first parameter by using signaling. FIG. 8 is a flowchart of still another communication method according to an embodiment of this application.

As shown in FIG. 8, the method includes the following steps.

S401: A terminal device determines, based on downlink channel information, a second parameter used for sending a first reference signal. Herein, the second parameter may be the same as or different from the foregoing first parameter.

It should be noted that, in this embodiment of this application, an example in which there is only one terminal device is used for describing the method 3. When there are a plurality of terminal devices, each of the plurality of terminal devices may perform the method 3. For example, when there are a plurality of terminal devices, each of the plurality of terminal devices may determine, by using the method in S401, a second parameter used by the terminal device for sending the first reference signal. It may be understood that second parameters determined by the plurality of terminal devices may be the same as or may be different from each other. For example, it is assumed that there are three terminal devices, denoted as a terminal device 1, a terminal device 2, and a terminal device 3. In this case, the terminal device 1 may determine a second parameter A of the terminal device 1 by using the method in S401: the terminal device 2 may determine a second parameter B of the terminal device 2 by using the method in S401; and the terminal device 3 may determine a second parameter C of the terminal device 3 by using the method in S401.

It should be noted that in this embodiment of this application, the second parameter may include only one parameter, or may include a group of parameters. This is not limited in this application. In addition, when the second parameter includes a group of parameters, a plurality of parameters in the group of parameters may be parameters of a same type, or may be parameters of different types. In this embodiment of this application, the second parameter may be all parameters used for sending the first reference signal, or may be a part of parameters used for sending the first reference signal.

In this embodiment of this application, the second parameter includes but is not limited to at least one of a size of a second precoding resource group (PRG) or a second bandwidth used for the first reference signal. The second bandwidth used for the first reference signal may be understood as a bandwidth used for sending/transmitting the first reference signal.

S402: The terminal device sends the second parameter to a network device, and the network device receives the second parameter from the terminal device. The second parameter is a parameter suggested for transmission of the first reference signal. For example, the terminal device may send second information to the network device, and indicate the second parameter through the second information. For example, the second information includes the second parameter, or the second information includes an indication bit, and the second parameter is indicated by using a value of the indication bit. Optionally, the indication bit may be at least one bit, and the value of the indication bit is a state of the at least one bit. When there are a plurality of terminal devices, after each of the plurality of terminal devices determines, by using the method in S401, a second parameter used by the terminal device for sending the first reference signal, each of the plurality of terminal devices may send, by using the method in S402, the second parameter determined by the terminal device. For example, it is still assumed that there are three terminal devices, denoted as a terminal device 1, a terminal device 2, and a terminal device 3. In this case, after determining a second parameter A of the terminal device 1 by using the method in S401, the terminal device 1 may send the second parameter A to the network device by using the method in S402; after determining a second parameter B of the terminal device 2 by using the method in S401, the terminal device 2 may send the second parameter B to the network device by using the method in S402; and after determining a second parameter C of the terminal device 3 by using the method in S401, the terminal device 3 may send the second parameter C to the network device by using the method in S402.

In a possible example, the second parameter sent by the terminal device to the network device may be carried on a physical uplink control channel (physical uplink control channel, PUCCH) or a physical uplink shared channel (physical uplink shared channel, PUSCH).

S403: The network device determines the first parameter based on at least one second parameter, where the at least one second parameter is from at least one terminal device. For example, when there is one terminal device, the network device determines the first parameter based on a second parameter sent by the terminal device. For example, when there are a plurality of terminal devices, the network device may comprehensively determine, based on second parameters reported by the plurality of terminal devices, a first parameter used by each terminal device. It may be understood that the first parameter used by each terminal device may be the same or may be different. For example, it is still assumed that there are three terminal devices, denoted as a terminal device 1, a terminal device 2, and a terminal device 3. The terminal device 1 sends a second parameter A to the network device by using the method in S402, the terminal device 2 sends a second parameter B to the network device by using the method in S402, and the terminal device 3 sends a second parameter C to the network device by using the method in S402. After receiving the second parameter A, the second parameter B, and the second parameter C, the network device may determine, based on at least one of the second parameter A, the second parameter B, and the second parameter C, a first parameter 1 used by the terminal device 1; may determine, based on at least one of the second parameter A, the second parameter B, and the second parameter C, a first parameter 2 used by the terminal device 2; or may determine, based on at least one of the second parameter A, the second parameter B, and the second parameter C, a first parameter 3 used by the terminal device 3. For still another example, an example in which the second parameter is the size of the second PRG is used for description. It is assumed that the network device determines, based on uplink channel state information, that services are congested at a moment (that is, there is an excessive quantity of services that need downlink transmission), and the network device needs to enable a large quantity of terminal devices to transmit first reference signals within a short period of time. In this case, even if a size of a second PRG reported by the terminal device is all downlink channels sent on a full bandwidth, the network device still rejects suggestion of the terminal device, and schedules a subband to send a compressed channel, to reduce a resource occupied by a first reference signal of a single terminal device, thereby improving multi-user multiplexing efficiency. It should be noted that in this example, only that the first parameter and the second parameter are different parameters is used for description. In this application, the first parameter determined by the network device may be equivalent to the second parameter. In other words, the first parameter determined by the network device may be the same as the second parameter, or may be different from the second parameter. This is not limited in this application.

S404: The network device sends first indication information to the terminal device, and the terminal device receives the first indication information from the network device, Where the first indication information is used to indicate the first parameter. For a description of the first indication information in S404, refer to S302. Details are not described herein again. When there are a plurality of terminal devices, after the network device determines a first parameter of each terminal device for each terminal device by using the method in S403, the network device may indicate, to each of the plurality of terminal devices by using the method in S404, the first parameter corresponding to each terminal device. For example, it is still assumed that there are three terminal devices, denoted as a terminal device 1, a terminal device 2, and a terminal device 3. The terminal device 1 sends a second parameter A to the network device by using the method in S402, the terminal device 2 sends a second parameter B to the network device by using the method in S402, and the terminal device 3 sends a second parameter C to the network device by using the method in S402. After receiving the second parameter A, the second parameter B, and the second parameter C, the network device may determine, based on at least one of the second parameter A, the second parameter B, and the second parameter C, a first parameter 1 used by the terminal device 1; may determine, based on at least one of the second parameter A, the second parameter B, and the second parameter C, a first parameter 2 used by the terminal device 2; or may determine, based on at least one of the second parameter A, the second parameter B, and the second parameter C, a first parameter 3 used by the terminal device 3. After determining the first parameter 1, the network device may send, to the terminal device 1, indication information used to indicate the first parameter 1. After determining the first parameter 2, the network device may send, to the terminal device 2, indication information used to indicate the first parameter 2. After determining the first parameter 3, the network device may send, to the terminal device 3, indication information used to indicate the first parameter 3.

The following uses an example in which the network device indicates a first parameter by using an indication bit for description.

Table 3 shows another possible correspondence between a value of the indication bit and the first parameter.

TABLE 3

| DCI indication | Physical meaning |
|---|---|
| 00 | Use a second parameter reported by the terminal device |
| 01 | Use a parameter 1 |
| 10 | Use a parameter 2 |
| 11 | Use a parameter 3 |

In Table 3, an example in which the first indication information is sent through DCI is used. It is assumed that the first parameter is indicated by using two bits of the DCI, and in Table 3, the first parameter includes the second parameter reported by the terminal device, and the parameter 1, the parameter 2, and the parameter 3 that are determined by the network device, a value 00 of two bits of the DCI is used to indicate the terminal device to send the first reference signal by using the reported second parameter, a value 01 of two bits of the DCI is used to indicate the terminal device to send the first reference signal by using the parameter 1, a value 10 of two bits of the DCI is used to indicate the terminal device to send the first reference signal by using the parameter 2, and a value 11 of two bits of the DCI is used to indicate the terminal device to send the first reference signal by using the parameter 3.

S405: The terminal device sends the first reference signal to the network device based on the first parameter, and the network device receives the first reference signal sent by the terminal device based on the first parameter. When there are a plurality of terminal devices, each of the plurality of terminal devices may send the first reference signal to the network device based on a first parameter used by the terminal device.

S406: The network device determines the downlink channel information based on the first reference signal.

S405 and S406 are the same as S102 and S103 respectively. For repeated content, refer to each other. Details are not described herein again.

Figure 9:
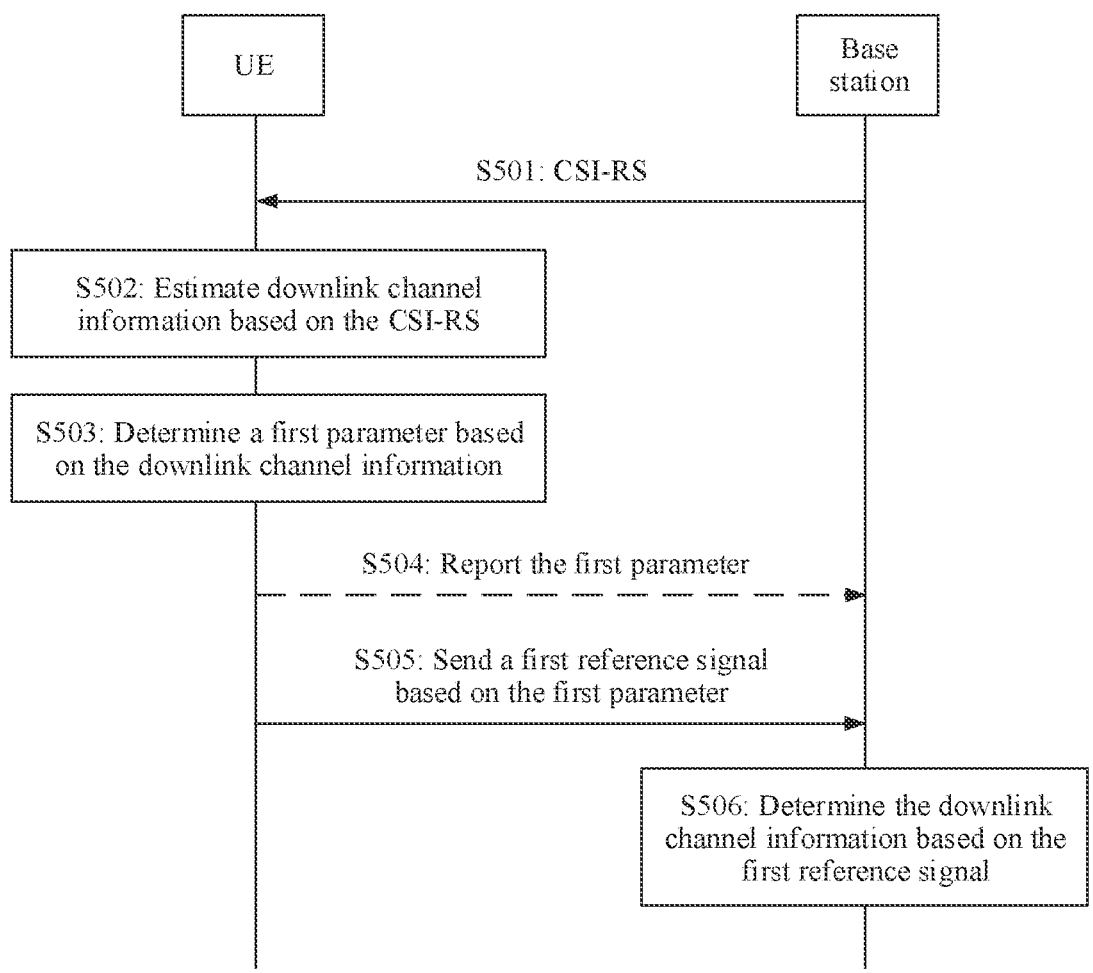
FIG. 9 is a flowchart of still another communication method according to an embodiment of this application.
Figure 10:
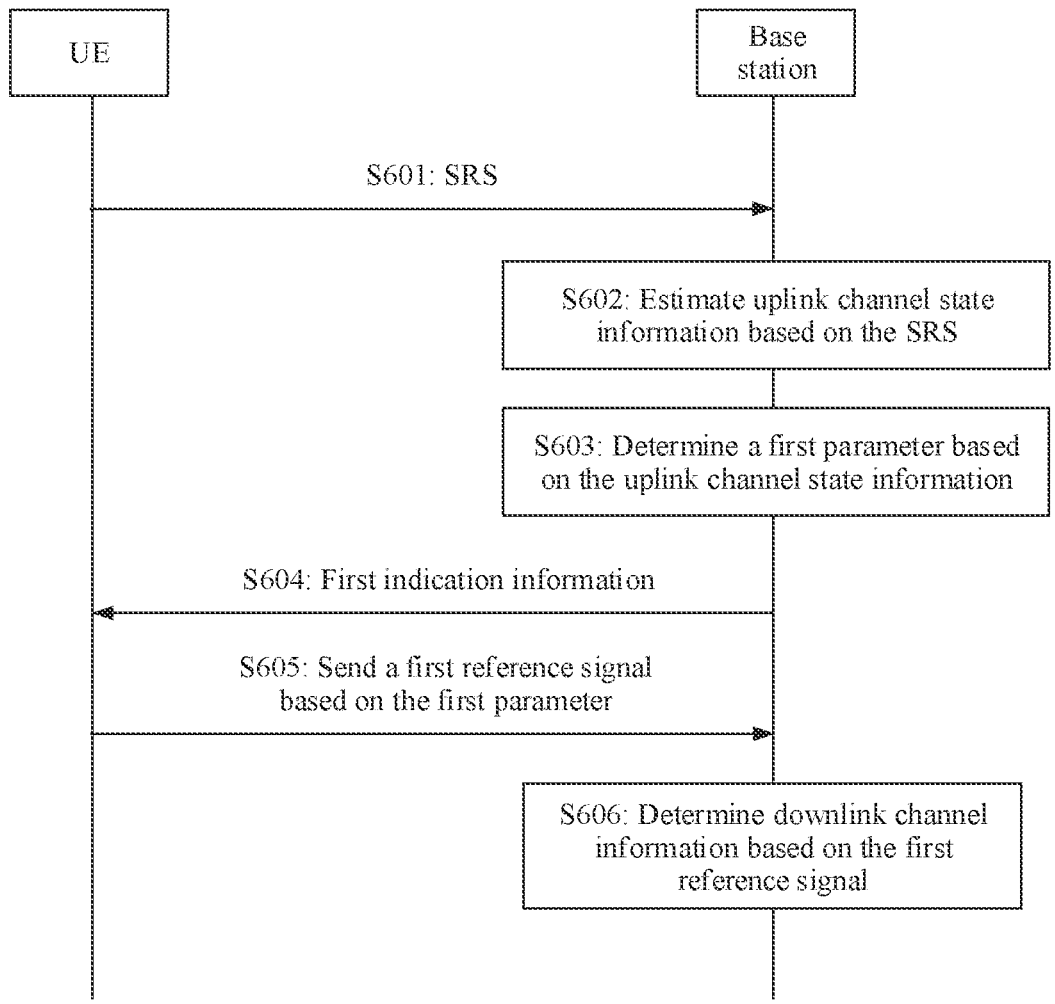
FIG. 10 is a flowchart of still another communication method according to an embodiment of this application.
Figure 11:
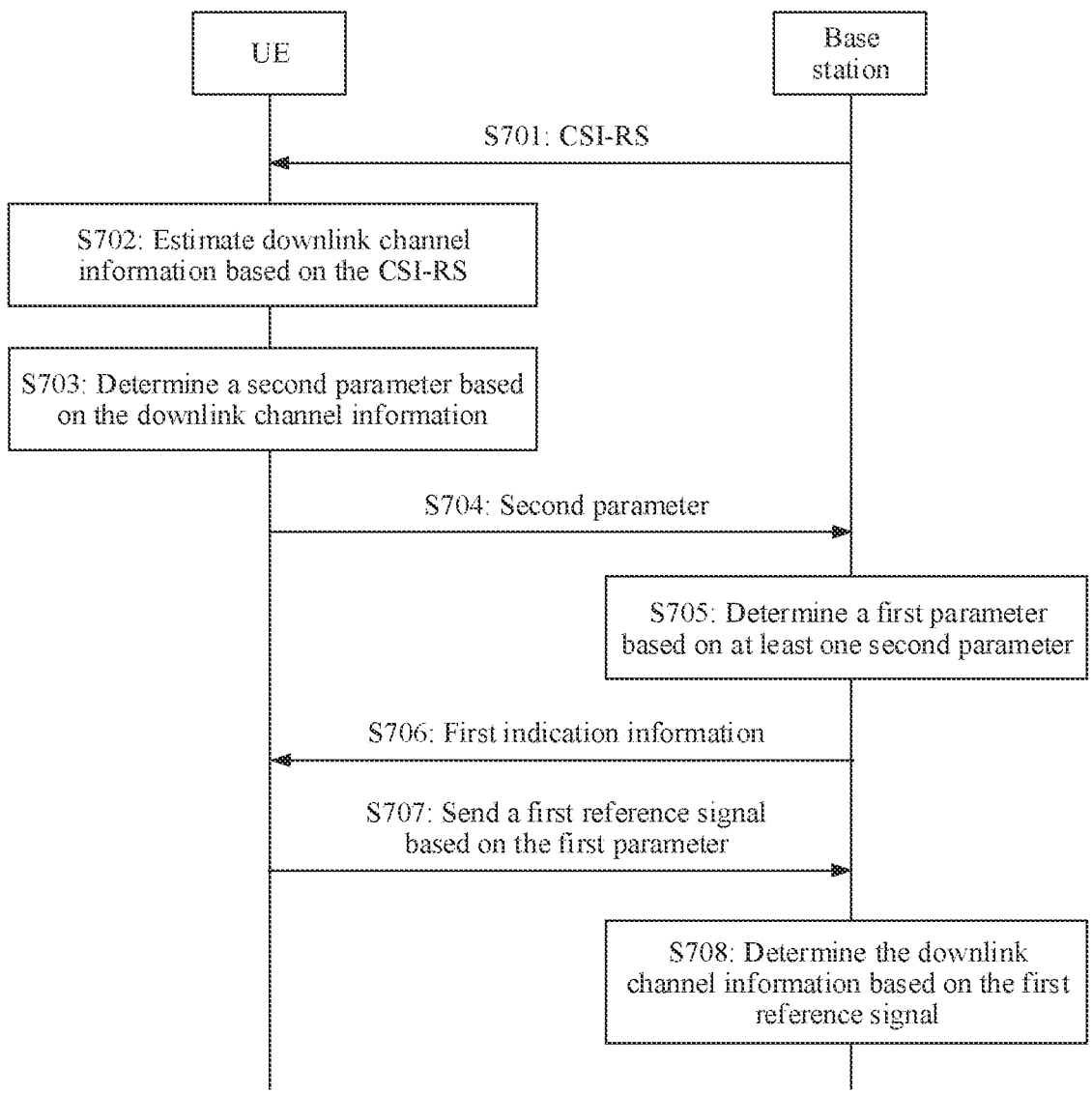
FIG. 11 is a flowchart of still another communication method according to an embodiment of this application.

With reference to FIG. 9 to FIG. 11, the following separately describes three methods for determining the first parameter provided in the embodiments of this application by using examples.

FIG. 9 is a flowchart of another communication method according to an embodiment of this application. In FIG. 9, an example in which a terminal device is UE, a network device is a base station, and the UE determines, based on downlink channel information, a first parameter used for sending a first reference signal is used for describing the method provided in this embodiment of this application.

The method shown in FIG. 9 includes the following steps.

S501: The base station sends a CSI-RS to the UE, and the UE receives the CSI-RS from the base station.

S502: The UE estimates the downlink channel information based on the CSI-RS.

S503: The UE determines the first parameter based on the downlink channel information. For how the UE determines the first parameter based on the downlink channel information, refer to related descriptions in S201 in FIG. 6.

S504: The UE reports the first parameter to the base station. S504 is an optional step, that is, the UE may alternatively not report the first parameter to the base station.

S505: The UE sends the first reference signal to the base station based on the first parameter, and the base station receives the first reference signal sent by the UE.

S506: The base station determines the downlink channel information based on the first reference signal.

According to the foregoing method, the UE determines the first parameter for sending the first reference signal, and the UE can directly send the first reference signal without waiting for scheduling by the base station, so that a sending delay can be reduced. In this way, the base station can quickly obtain the downlink channel information and schedule downlink transmission to the UE more quickly.

FIG. 10 is a flowchart of still another communication method according to an embodiment of this application. In FIG. 10, an example in which a terminal device is UE, a network device is a base station, and the base station indicates a first parameter used for sending a first reference signal is used for describing the method provided in this embodiment of this application.

The method shown in FIG. 10 includes the following steps.

S601: The UE sends an SRS to the base station, and the base station receives the SRS from the UE.

S602: The base station estimates uplink channel state information based on the SRS.

S603: The base station determines, based on the uplink channel state information, the first parameter used for sending the first reference signal. For how the base station determines the first parameter based on the uplink channel state information, refer to related descriptions in S301 in FIG. 7.

S604: The base station sends first indication information to the UE, and the UE receives the first indication information from the base station, where the first indication information is used to indicate the first parameter, and the first parameter is used to indicate transmission of the first reference signal.

S605: The UE sends the first reference signal to the base station based on the first parameter, and the base station receives the first reference signal sent by the UE.

S606: The base station determines downlink channel information based on the first reference signal.

According to the foregoing method, signaling interaction is performed between the base station and the UE, so that each piece of UE can send the first reference signal by using an optimal parameter or a nearly optimal parameter, thereby improving downlink channel feedback performance.

FIG. 11 is a flowchart of still another communication method according to an embodiment of this application. In FIG. 11, an example in which a terminal device is UE and a network device is a base station is used for describing the method provided in this embodiment of this application.

The method shown in FIG. 11 includes the following steps.

S701: The base station sends a CSI-RS to the UE, and the UE receives the CSI-RS from the base station.

In this embodiment of this application, an example in which there is one piece of UE is used for description. When there are a plurality of pieces of UE, each of the plurality of pieces of UE may perform the method.

S702: The UE estimates downlink channel information based on the CSI-RS.

S703: The UE determines a second parameter based on the downlink channel information. It should be noted that, when there are a plurality of pieces of UE, each of the plurality of pieces of UE may determine, by using the method in S703, a second parameter used by the UR. It may be understood that second parameters determined by the plurality of pieces of UE may be the same as or may be different from each other. For example, it is assumed that there are three pieces of UE, denoted as UE 1, UE 2, and UE 3. In this case, the UE 1 may determine a second parameter AA of the UE 1 by using the method in S703; the UE 2 may determine a second parameter BB of the UE 2 by using the method in S703; and the UE 3 may determine a second parameter CC of the UE 3 by using the method in S703.

In a possible example, the second parameter may be an optimal parameter used for sending a first reference signal.

S704: The UE sends the second parameter to the base station, and the base station receives the second parameter sent by the UE. S704 may be understood as that the UE suggests the base station to send the first reference signal by using the second parameter. When there are a plurality of pieces of UE, after each of the plurality of pieces of UE determines, by using the method in S703, a second parameter used by the UE for sending the first reference signal, each of the plurality of pieces of UE may send the second parameter determined by the UE, by using the method in S704. For example, it is still assumed that there are three pieces of UE, denoted as UE 1. UE 2, and UE 3. In this case, after determining a second parameter AA of the UE 1 by using the method in S703, the UE 1 may send the second parameter AA to the base station by using the method in S704; after determining a second parameter BB of the UE 2 by using the method in S703, the UE 2 may send the second parameter BB to the base station by using the method in S704; and after determining a second parameter CC of the UE 3 by using the method in S703, the UE 3 may send the second parameter CC to the base station by using the method in S704.

S705: The base station determines the first parameter based on at least one second parameter, where the at least one second parameter is from at least one piece of UE. For example, when there is one piece of UE, the base station determines a first parameter of the UE based on a second parameter sent by the UE. For example, when there are a plurality of pieces of UE, the base station may comprehensively determine, based on second parameters reported by the plurality of pieces of UE, a first parameter used by each piece of UE. It may be understood that the first parameter used by each piece of UE may be the same or may be different. For example, it is still assumed that there are three pieces of UE, denoted as UE 1, UE 2, and UE 3, The UE 1 sends a second parameter AA to the base station by using the method in S704, the UE 2 sends a second parameter BB to the base station by using the method in S704, and the UE 3 sends a second parameter CC to the base station by using the method in S704. After receiving the second parameter AA, the second parameter BB, and the second parameter CC, the base station may determine, based on at least one of the second parameter AA, the second parameter BB, and the second parameter CC, a first parameter 11 used by the UE 1; may determine, based on at least one of the second parameter AA, the second parameter BB, and the second parameter CC, a first parameter 22 used by the UE 2; or may determine, based on at least one of the second parameter AA, the second parameter BB, and the second parameter CC, a first parameter 33 used by the UE 3.

It should be noted that the first parameter determined in S705 and the second parameter in S704 may be a same parameter or may be different parameters.

S706: The base station sends first indication information to the UE, and the UE receives the first indication information from the base station, where the first indication information is used to indicate the first parameter. When there are a plurality of pieces of UE, after the base station determines a first parameter of each piece of UE for each piece of UE by using the method in S705, the base station may indicate, to each of the plurality of pieces of UE, the first parameter corresponding to each piece of UE by using the method in S706. For example, it is still assumed that there are three pieces of UE, denoted as UE 1, UE 2, and UE 3. The UE 1 sends a second parameter AA to the base station by using the method in S704, the UE 2 sends a second parameter BB to the base station by using the method in S704, and the UE 3 sends a second parameter CC to the base station by using the method in S704. After receiving the second parameter AA, the second parameter BB, and the second parameter CC, the base station may determine, based on at least one of the second parameter AA, the second parameter BB, and the second parameter CC, a first parameter 11 used by the UE 1; may determine, based on at least one of the second parameter AA, the second parameter BB, and the second parameter CC, a first parameter 22 used by the UE 2; or may determine, based on at least one of the second parameter AA, the second parameter BB, and the second parameter CC, a first parameter 33 used by the UE 3, After determining the first parameter 11, the base station may send indication information used to indicate the first parameter 11 to the UE 1. After determining the first parameter 22, the base station may send indication information used to indicate the first parameter 22 to the UE 2. After determining the first parameter 33, the base station may send indication information used to indicate the first parameter 33 to the UE 3.

S707: The UE sends the first reference signal to the base station based on the first parameter, and the base station receives the first reference signal sent by the UE. When there are a plurality of pieces of UE, each of the plurality of pieces of UE may send the first reference signal to the base station based on a first parameter used by the UE.

S708: The base station determines the downlink channel information based on the first reference signal.

According to the foregoing method, signaling interaction is performed between the base station and the UE, so that each piece of UE can send the first reference signal by using an optimal parameter or a nearly optimal parameter, thereby improving downlink channel feedback performance.

Figure 12:
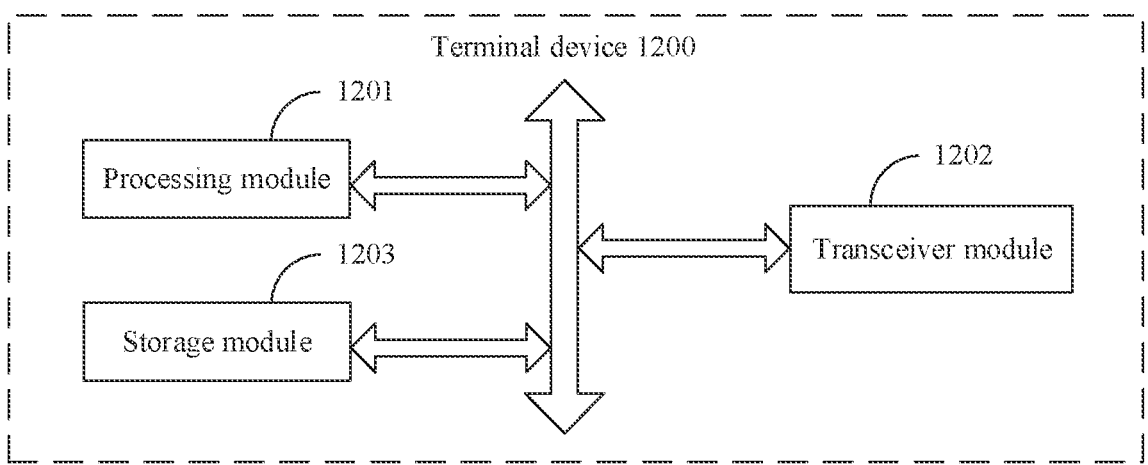
FIG. 12 is a schematic structural diagram of a terminal device according to an embodiment of this application.

Based on a same inventive concept, an embodiment of this application further provides a terminal device. The terminal device may have a structure shown in FIG. 12, and have a function for behavior of the terminal device in the foregoing method embodiments. As shown in FIG. 12, the terminal device 1200 may include a processing module 1201 and a transceiver module 1202. The processing module 1201 may be configured to determine a first parameter used for sending a first reference signal, where the first reference signal is used to carry downlink channel information. The transceiver module 1202 may be configured to send the first reference signal to a network device based on the first parameter. In an implementation, the terminal device 1200 may further include a storage module 1203. The storage module 1203 may be coupled to the processing module 1201, and is configured to store a program and instructions that are necessary for the processing module 1201 to perform a function.

Based on the communication method shown in FIG. 5, the processing module 1201 in the terminal device 1200 shown in FIG. 12 may be used by the terminal device 1200 to perform the step of S101, and the transceiver module 1202 may be used by the terminal device 1200 to perform the step of S102.

In a possible design, the processing module 1201 is specifically configured to:
determine the first parameter based on the downlink channel information.

In a possible design, the transceiver module 1202 is further configured to:
receive first indication information from the network device, where the first indication information is used to indicate the first parameter.

In a possible design, the processing module 1201 is further configured to:
determine, based on the downlink channel information, a second parameter used for sending the first reference signal.

The transceiver module 1202 is further configured to:
send the second parameter to the network device.

In a possible design, the first parameter belongs to a first parameter set, and the first parameter set is configured by using higher layer signaling or predefined.

In a possible design, the processing module 1201 determines the first parameter based on the downlink channel information in the following manner: determining, in the first parameter set, the first parameter based on the downlink channel information.

In a possible design, the transceiver module 1202 is further configured to:

send the first parameter to the network device: or
establish a correspondence between a format of the first reference signal and the first parameter, where the correspondence is predefined or configured by using higher layer signaling.

In a possible design, the first parameter includes at least one of a size of a first PRG or a first bandwidth used for the first reference signal; and/or the second parameter includes at least one of a size of a second PRG or a second bandwidth used for the first reference signal.

Figure 13:
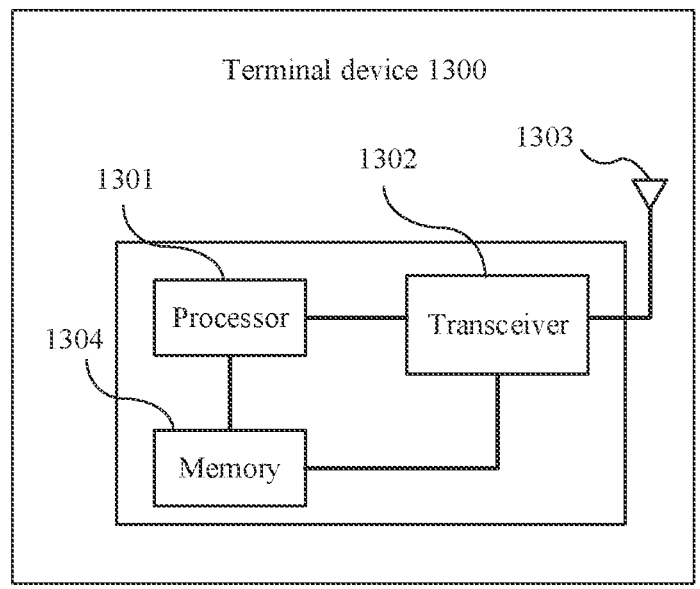
FIG. 13 is a schematic structural diagram of another terminal device according to an embodiment of this application.

In addition, the terminal device in this embodiment of this application may further have a structure of a terminal device 1300 shown in FIG. 13. A processor 1301 in the terminal device 1300 shown in FIG. 13 may be configured to implement a function of the processing module 1201. For example, the processor 1301 may be used by the terminal device 1300 to perform the step of S101 in the communication method shown in FIG. 5. A transceiver 1302 may be configured to implement a function of the transceiver module 1202. For example, the transceiver 1302 may be used by the terminal device 1300 to perform the step of S102 in the communication method shown in FIG. 5. In addition, the transceiver 1302 may be coupled to an antenna 1303, and is configured to support the terminal device 1300 in performing communication. For example, the terminal device 1300 may further include a memory 1304. The memory 1304 stores a computer program and instructions. The memory 1304 may be coupled to the processor 1301 and/or the transceiver 1302, and is configured to support the processor 1301 in invoking the computer program and the instructions in the memory 1304, to implement steps related to the terminal device in the method provided in the embodiments of this application. In addition, the memory 1304 may be further configured to store data in the method embodiments of this application, for example, configured to store data and instructions that are necessary for supporting the transceiver 1302 in implementing interaction, and/or configured to store configuration information necessary for the terminal device 1300 to perform the method in the embodiments of this application.

Figure 14:
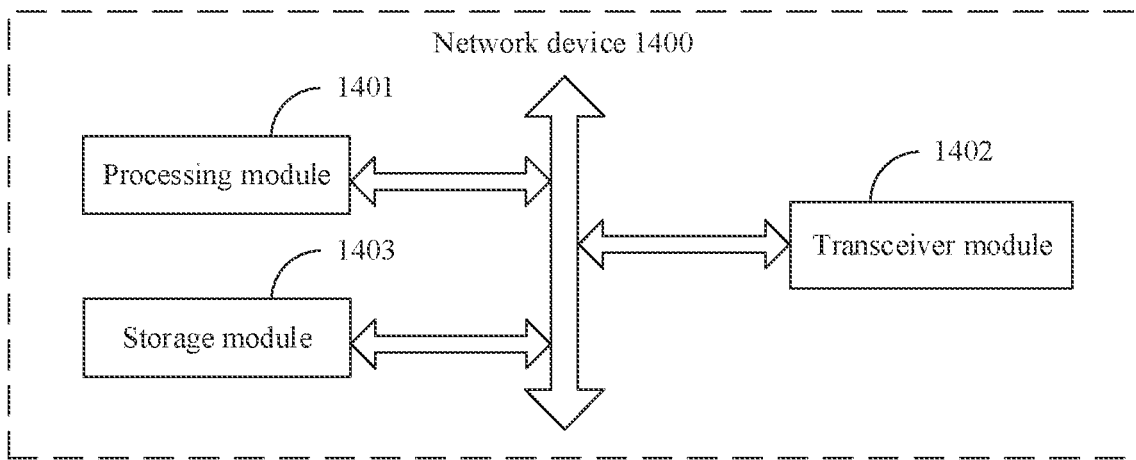
FIG. 14 is a schematic structural diagram of a network device according to an embodiment of this application.

Based on a same inventive concept, an embodiment of this application further provides a network device. The network device may have a structure shown in FIG. 14, and have a function for behavior of the network device in the foregoing method embodiments. As shown in FIG. 14, the network device 1400 may include a processing module 1401 and a transceiver module 1402. The transceiver module 1402 is configured to receive a first reference signal from a terminal device, where the first reference signal is used to carry downlink channel information. The processing module 1401 is configured to determine the downlink channel information based on the first reference signal. In an implementation, the network device 1400 may further include a storage module 1403. The storage module 1403 may be coupled to the processing module 1401, and is configured to store a program and instructions that are necessary for the processing module 1401 to perform a function.

Based on the communication method shown in FIG. 5, the processing module 1401 in the network device 1400 shown in FIG. 14 may be used by the network device 1400 to perform the step of S103, and the transceiver module 1402 may be used by the network device 1400 to perform the step of S102.

In a possible design, the transceiver module 1402 is further configured to:
send first indication information to the terminal device, where the first indication information is used to indicate a first parameter, and the first parameter is used to indicate transmission of the first reference signal.

In a possible design, the processing module 1401 is further configured to:

determine the first parameter based on uplink channel state information before the transceiver module 1402 sends the first indication information to the terminal device; or determine the first parameter based on at least one second parameter before the transceiver module 1402 sends the first indication information to the terminal device, where the at least one second parameter is from at least one terminal device, and the second parameter is a parameter suggested for the transmission of the first reference signal.

In a possible design, the transceiver module 1402 is further configured to:

receive the first parameter from the terminal device; or establish a correspondence between a format of the first reference signal and the first parameter, and the correspondence is predefined.

In a possible design, the first parameter includes at least one of a size of a first PRG or a first bandwidth used for the first reference signal; and/or the second parameter includes at least one of a size of a second PRG or a second bandwidth used for the first reference signal.

In a possible design, the first parameter belongs to a first parameter set, where the transceiver module 1402 configures the first parameter set for the terminal device by using higher layer signaling, or the first parameter set is predefined.

Figure 15:
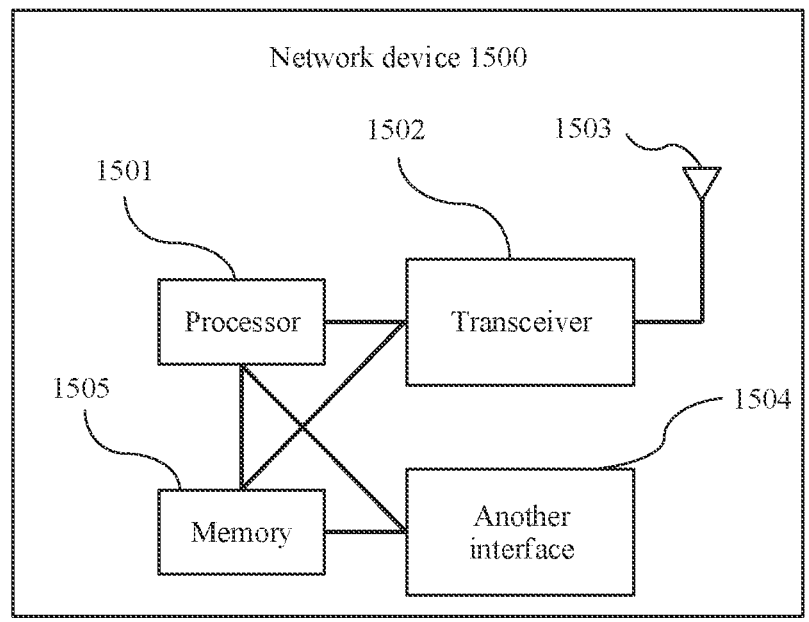
FIG. 15 is a schematic structural diagram of another network device according to an embodiment of this application.

In addition, the network device in this embodiment of this application may further have a structure of a network device 1500 shown in FIG. 15. A processor 1501 in the network device 1500 shown in FIG. 15 may be configured to implement a function of the processing module 1401. A transceiver 1502 may be configured to implement a function of the transceiver module 1402. In addition, the transceiver 1502 may be coupled to an antenna 1503, and is configured to support the network device 1500 in performing communication. For example, the network device 1500 may further include another interface 1504, and is configured to support the network device 1500 in performing interaction in a wired manner. For example, the another interface 1504 may be an optical fiber link interface, an Ethernet interface, or a copper cable interface. For example, the network device 1500 may further include a memory 1505. The memory 1505 stores a computer program and instructions. The memory 1505 may be coupled to the processor 1501 and/or the transceiver 1502, and is configured to support the processor 1501 in invoking the computer program and the instructions in the memory 1505, to implement steps related to the network device 1500 in the method provided in the embodiments of this application. In addition, the memory 1505 may be further configured to store data in the method embodiments of this application, for example, configured to store data and instructions that are necessary for supporting the transceiver 1502 in implementing interaction.

An embodiment of this application further provides a communication apparatus, and the communication apparatus may be a terminal device or a circuit. The communication apparatus may be configured to perform an action performed by the terminal device in the foregoing method embodiments.

Figure 16:
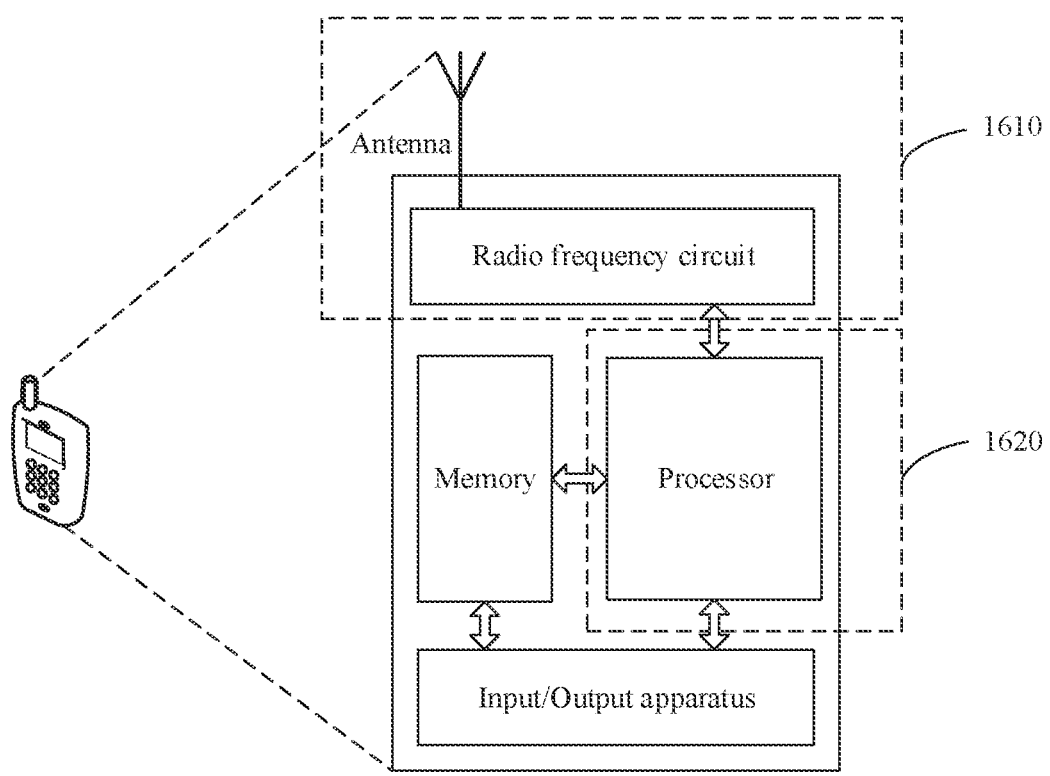
FIG. 16 is a schematic structural diagram of still another terminal device according to an embodiment of this application.

When the communication apparatus is a terminal device, FIG. 16 is a schematic diagram of a simplified structure of the terminal device. For ease of understanding and convenience of figure illustration, an example in which the terminal device is a mobile phone is used in FIG. 16. As shown in FIG. 16, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send the radio frequency signal in a form of electromagnetic waves. The input/output apparatus, such as a touchscreen, a display, or a keyboard, is mainly configured to: receive data entered by a user, and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends, through the antenna, the radio frequency signal in the form of electromagnetic waves. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 16. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 16, the terminal device includes a transceiver unit 1610 and a processing unit 1620. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. In other words, the transceiver unit 1610 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1610 is configured to perform a sending operation and a receiving operation on a terminal device side in the foregoing method embodiments, and the processing unit 1620 is configured to perform another operation other than the receiving operation and the sending operation of the terminal device in the foregoing method embodiments.

For example, in an implementation, the processing unit 1620 is configured to perform an operation of the terminal device in S101 in FIG. 5, and the processing unit 1620 is further configured to perform another processing step of the terminal device in the embodiments of this application. The transceiver unit 1610 is configured to perform an operation of the terminal device in S102 in FIG. 5, and/or the transceiver unit 1610 is further configured to perform other receiving and sending steps of the terminal device in the embodiments of this application.

For another example, in another implementation, the processing unit 1620 is configured to perform an operation of the terminal device in S201 in FIG. 6, and the processing unit 1620 is further configured to perform another processing step of the terminal device in the embodiments of this application. The transceiver unit 1610 is configured to perform an operation on a terminal device side in S202 in FIG. 6, and/or the transceiver unit 1610 is further configured to perform other receiving and sending steps on the terminal device side in the embodiments of this application.

For still another example, in still another implementation, the transceiver unit 1610 is configured to perform an operation on a terminal device side in S302 and S303 in FIG. 7, and/or the transceiver unit 1610 is further configured to perform other receiving and sending steps on the terminal device side in the embodiments of this application.

For still another example, in still another implementation, the processing unit 1620 is configured to perform an operation of the terminal device in S401 in FIG. 8, and the processing unit 1620 is further configured to perform another processing step of the terminal device in the embodiments of this application. The transceiver unit 1610 is configured to perform an operation on a terminal device side in S402, S404, and S405 in FIG. 8, and/or the transceiver unit 1610 is further configured to perform other receiving and sending steps on the terminal device side in the embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 17:
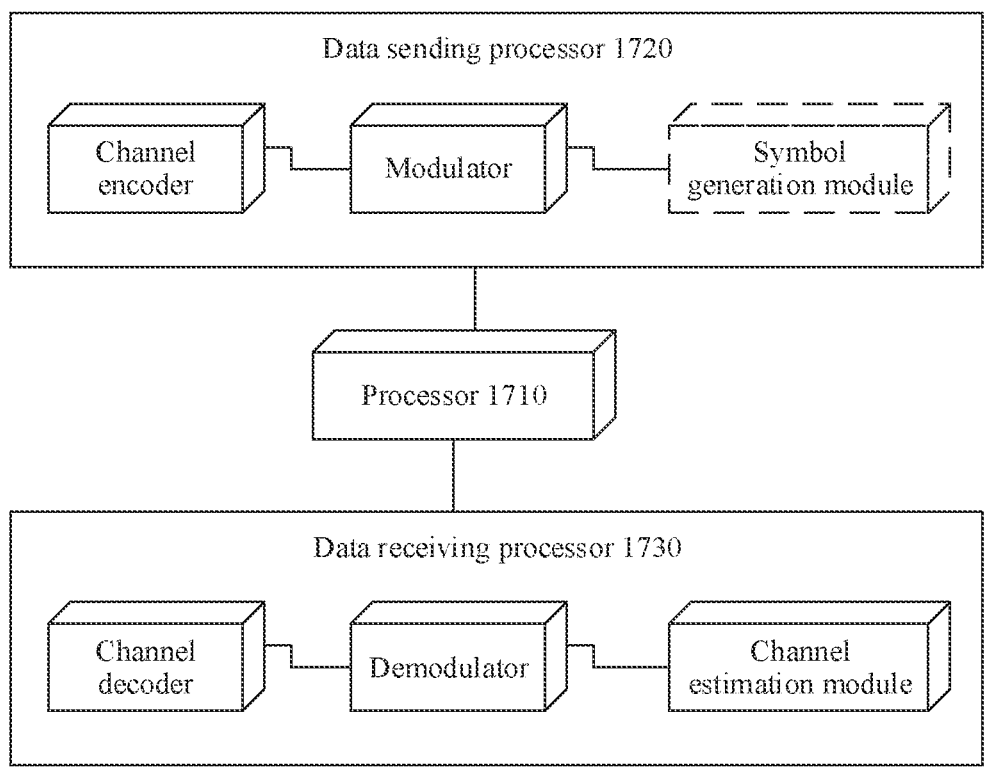
FIG. 17 is a schematic structural diagram of still another terminal device according to an embodiment of this application.

When the communication apparatus in this embodiment is a terminal device, refer to a device shown in FIG. 17. As an example, the device may implement a function similar to that of the processor 1301 in FIG. 13. In FIG. 17, the device includes a processor 1710, a data sending processor 1720, and a data receiving processor 1730, The processing module 1201 in the foregoing embodiment may be the processor 1710 in FIG. 17, and completes a corresponding function. The transceiver module 1202 in the foregoing embodiment may be the data sending processor 1720 and/or the data receiving processor 1730 in FIG. 17. Although FIG. 17 shows a channel encoder and a channel decoder, it may be understood that these modules are merely examples and do not constitute a limitation on this embodiment.

Figure 18:
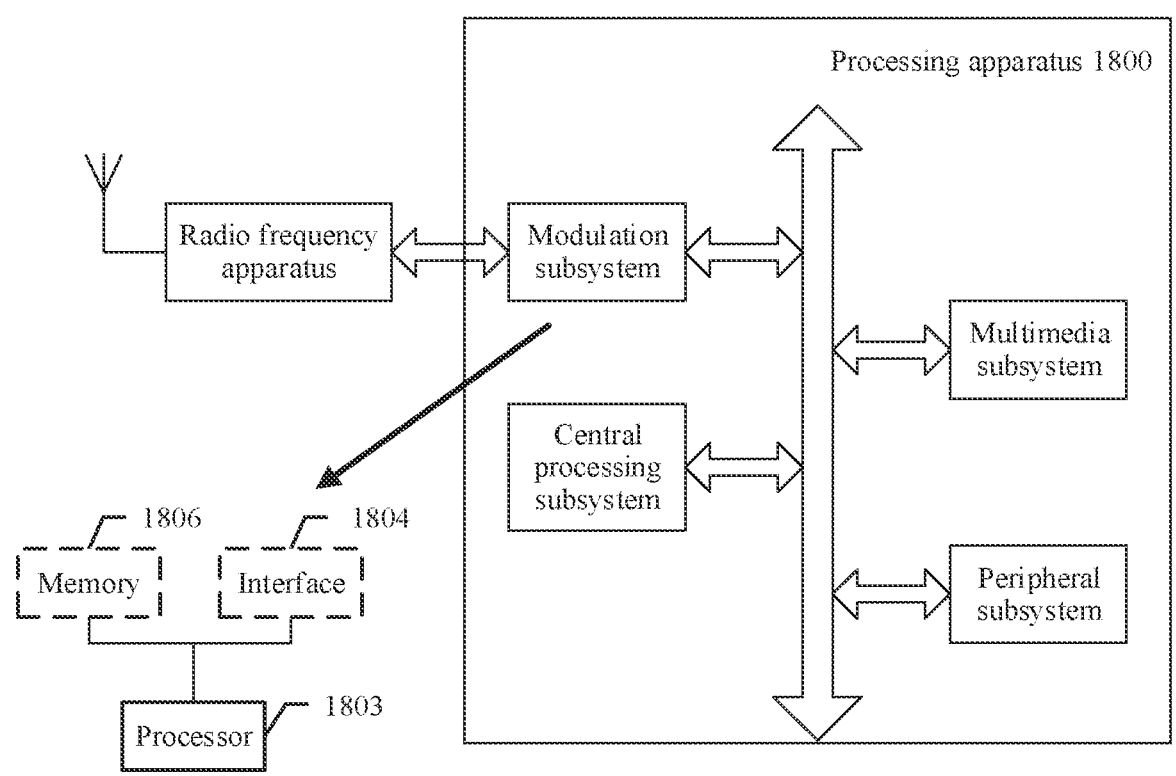
FIG. 18 is a schematic structural diagram of still another terminal device according to an embodiment of this application.

FIG. 18 shows another form of this embodiment. A processing apparatus 1800 includes modules such as a modulation subsystem, a central processing subsystem, and a peripheral subsystem. The communication apparatus in the embodiments may be used as the modulation subsystem in the processing apparatus. Specifically, the modulation subsystem may include a processor 1803 and an interface 1804. The processor 1803 implements a function of the processing module 1201, and the interface 1804 implements a function of the transceiver module 1202. In another variation, the modulation subsystem includes a memory 1806, a processor 1803, and a program that is stored in the memory 1806 and that can be run on the processor. When executing the program, the processor 1803 implements the method on the terminal device side in the foregoing method embodiments. It should be noted that the memory 1806 may be nonvolatile or volatile. The memory 1806 may be located in the modulation subsystem, or may be located in the processing apparatus 1800, provided that the memory 1806 can be connected to the processor 1803.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product that includes instructions is provided. When the instructions are executed, the method on the terminal device side in the foregoing method embodiments is performed.

It should be understood that the processor mentioned in the embodiments of the present invention may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA), or another programmable logic device, discrete gate or transistor logic device, discrete hardware component, or the like. The general-purpose processor may be a microprocessor, or the processor may be any conventional processor or the like.

It should further be understood that the memory in the embodiments of the present invention may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory. RAM) that is used as an external buffer. Through examples but not limitative descriptions, many forms of RAIN/Is may be used, for example, a static random access memory (static. RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification includes but is not limited to the memories and any other appropriate types of memory.

It should be understood that, in the embodiments of this application, sequence numbers of the foregoing processes do not mean execution sequences. The execution sequences of the processes should be determined based on functions and internal logic of the processes, and should not be construed as any limitation on the implementation processes of the embodiments of the present invention.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device are used to generate an apparatus for implementing a specific function in one or more processes in the flowcharts and/or in one or more blocks in the block diagrams.

The computer program instructions may alternatively be stored in a computer-readable memory that can indicate the computer or the another programmable data processing device to work in a specific manner, so that the instructions stored in the computer-readable memory are used to generate an artifact that includes an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and steps are performed on the computer or the another programmable device to generate computer-implemented processing. Therefore, the instructions executed on the computer or the another programmable device are used to provide a step for implementing a specific function in one or more processes in the flowcharts and/or in one or more blocks in the block diagrams.

Although some possible embodiments of this application is described, a person skilled in the art can make changes and modifications to the embodiments once the basic inventive concept is learned. Therefore, the following claims are intended to be construed to cover the embodiments of this application and all changes and modifications that fall within the scope of this application.

What is claimed is:

1. A method, comprising:
   determining, by a terminal device, a first parameter for sending a first uplink reference signal based on downlink channel information, wherein the first uplink reference signal carries the downlink channel information; and
   sending, by the terminal device, the first uplink reference signal that carries the downlink channel information to a network device based on the first parameter.

2. The method according to claim 1, wherein the method comprises:
   receiving, by the terminal device, first indication information from the network device, wherein the first indication information indicates the first parameter.

3. The method according to claim 2, wherein the method comprises:
   determining, by the terminal device, a second parameter for sending the first uplink reference signal based on the downlink channel information; and
   sending, by the terminal device, the second parameter to the network device.

4. The method according to claim 3, wherein the first parameter comprises at least one of a size of a first precoding resource group (PRG) or a first bandwidth for the first uplink reference signal, and the second parameter comprises at least one of a size of a second PRG or a second bandwidth for the first uplink reference signal.

5. The method according to claim 1, wherein the first parameter belongs to a first parameter set, and the first parameter set is configured using a higher layer signaling or is predefined.

6. The method according to claim 5, wherein determining, by the terminal device, the first parameter for sending the first uplink reference signal based on the downlink channel information comprises:
   determining, by the terminal device, the first parameter in the first parameter set based on the downlink channel information.

7. The method according to claim 1, wherein the method comprises:
   sending, by the terminal device, the first parameter to the network device; or
   establishing a correspondence between a format of the first uplink reference signal and the first parameter, wherein the correspondence is predefined or is configured using a higher layer signaling.

8. A method, comprising:
   receiving, by a network device, a first uplink reference signal from a terminal device, wherein the first uplink reference signal carries downlink channel information; and
   determining, by the network device, the downlink channel information based on the first uplink reference signal.

9. The method according to claim 8, wherein the method comprises:
   sending, by the network device, first indication information to the terminal device, wherein the first indication information indicates a first parameter, and the first parameter indicates a transmission of the first uplink reference signal.

10. The method according to claim 9, wherein the method comprises:
    determining, by the network device, the first parameter based on at least one second parameter, wherein the at least one second parameter is from at least one terminal device, and the at least one second parameter is a parameter suggested for the transmission of the first uplink reference signal; or
    determining, by the network device, the first parameter based on uplink channel state information.

11. The method according to claim 10, wherein the first parameter comprises at least one of a size of a first precoding resource group (PRG) or a first bandwidth for the first uplink reference signal, and the second parameter comprises at least one of a size of a second PRG or a second bandwidth for the first uplink reference signal.

12. The method according to claim 9, wherein the first parameter belongs to a first parameter set, and the first parameter set is configured for the terminal device using a higher layer signaling or is predefined.

13. The method according to claim 9, wherein the method comprises:

receiving, by the network device, the first parameter from the terminal device; or establishing a correspondence between a format of the first uplink reference signal and the first parameter, and wherein the correspondence is predefined.

14. An apparatus, comprising:
one or more processors; and
a non-transitory memory for storing computer instructions that when executed by the one or more processors cause the apparatus to perform operations of:
  determining a first parameter for sending a first uplink reference signal based on downlink channel information, wherein the first uplink reference signal carries the downlink channel information; and
  sending the first uplink reference signal that carries the downlink channel information to a network device based on the first parameter.

15. The apparatus according to claim 14, wherein the computer instructions, when executed by the one or more processors, cause the apparatus to:
receive first indication information from the network device, wherein the first indication information indicates the first parameter.

16. The apparatus according to claim 15, wherein the computer instructions, when executed by the one or more processors, cause the apparatus to:
determine a second parameter for sending the first uplink reference signal based on the downlink channel information; and
send the second parameter to the network device.

17. The apparatus according to claim 16, wherein the first parameter comprises at least one of a size of a first precoding resource group (PRG) or a first bandwidth for the first uplink reference signal, and the second parameter comprises at least one of a size of a second PRG or a second bandwidth for the first uplink reference signal.

18. An apparatus, comprising:
one or more processors; and
a non-transitory memory for storing computer instructions that when executed by the one or more processors cause the apparatus to perform operations of:
  receiving a first uplink reference signal from a terminal device, wherein the first uplink reference signal carries downlink channel information; and
  determining the downlink channel information based on the first uplink reference signal.

19. The apparatus according to claim 18, wherein the computer instructions, when executed by the one or more processors, cause the apparatus to:
send first indication information to the terminal device, wherein the first indication information indicates a first parameter, and the first parameter indicates a transmission of the first uplink reference signal.

20. The apparatus according to claim 19, wherein the computer instructions, when executed by the one or more processors, cause the apparatus to:
determine the first parameter based on at least one second parameter, wherein the at least one second parameter is from at least one terminal device, and the at least one second parameter is a parameter suggested for the transmission of the first uplink reference signal; or
determine the first parameter based on uplink channel state information.

* * * * *